US009083602B2

(12) United States Patent
Endo et al.

(10) Patent No.: US 9,083,602 B2
(45) Date of Patent: Jul. 14, 2015

(54) COMMUNICATION SYSTEM AND COMMUNICATION DEVICE

(75) Inventors: Hideki Endo, Kawasaki (JP); Taisuke Ueta, Yokohama (JP); Yoshihiro Ashi, Yokohama (JP); Norio Miyazaki, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 169 days.

(21) Appl. No.: 13/512,480

(22) PCT Filed: Nov. 30, 2009

(86) PCT No.: PCT/JP2009/070097
§ 371 (c)(1),
(2), (4) Date: May 29, 2012

(87) PCT Pub. No.: WO2011/064884
PCT Pub. Date: Jun. 3, 2011

(65) Prior Publication Data

US 2012/0236866 A1 Sep. 20, 2012

(51) Int. Cl.

| | |
|---|---|
| ***H04L 12/28*** | (2006.01) |
| ***H04L 12/701*** | (2013.01) |
| ***H04L 12/26*** | (2006.01) |
| ***H04L 12/733*** | (2013.01) |
| ***H04L 12/723*** | (2013.01) |

(52) U.S. Cl.
CPC ............ *H04L 45/00* (2013.01); *H04L 43/0811* (2013.01); *H04L 45/20* (2013.01); *H04L 45/50* (2013.01)

(58) Field of Classification Search
CPC ............................ H04L 43/0811; H04L 45/50
USPC ........................................................ 370/392
See application file for complete search history.

(56) References Cited

U.S. PATENT DOCUMENTS

| | | | | |
|---|---|---|---|---|
| 6,404,740 | B1 | 6/2002 | Yoshida | |
| 7,864,685 | B2 * | 1/2011 | Iwamoto | 370/236.2 |

(Continued)

FOREIGN PATENT DOCUMENTS

| | | | |
|---|---|---|---|
| JP | 09-107361 | A | 4/1997 |
| JP | 11-122261 | A | 4/1999 |

OTHER PUBLICATIONS

Japanese Office Action received in Japanese Application No. 2013-051037 dated Jan. 21, 2014.

(Continued)

*Primary Examiner* — Asad Nawaz
*Assistant Examiner* — Syed S Ali
(74) *Attorney, Agent, or Firm* — Mattingly & Malur, PC

(57) ABSTRACT

Provided is a communication system which is provided with a plurality of communication devices and transfers a packet between the plurality of communication devices through a communication path. When a packet is looped back at any of the communication devices on the communication path to verify connectivity of the communication path, a first communication device of the plurality of communication devices stores, in a first region of header information of the packet, first information for designating the communication device at which the packet is looped back, further stores, in a second region of the header information of the packet, second information on a loopback point in the designated communication device at which the packet is looped back, and sends the packet to which the first information and the second information have been added.

17 Claims, 28 Drawing Sheets

(56) References Cited

U.S. PATENT DOCUMENTS

| | | | | |
|---|---|---|---|---|
| 2003/0108029 | A1* | 6/2003 | Behzadi | 370/351 |
| 2004/0136385 | A1* | 7/2004 | Xue et al. | 370/401 |
| 2005/0169188 | A1* | 8/2005 | Cometto et al. | 370/249 |
| 2005/0201273 | A1* | 9/2005 | Shimizu | 370/216 |
| 2005/0268324 | A1* | 12/2005 | An | 725/152 |
| 2006/0013145 | A1* | 1/2006 | Boodaghians | 370/249 |
| 2007/0183415 | A1* | 8/2007 | Fischer et al. | 370/389 |
| 2008/0298365 | A1* | 12/2008 | Mitumori | 370/390 |
| 2010/0238812 | A1* | 9/2010 | Boutros et al. | 370/249 |
| 2012/0236866 | A1* | 9/2012 | Endo et al. | 370/392 |

OTHER PUBLICATIONS

Kompella, "Detecting Multi-Protocol Label Switched (MPLS) Data Plane Failures", Network Working Group, Feb. 2006.

ITU-T Advisory Draft, "Operation & Maintenance mechanisms for T-MPLS layer networks", Telecommunication Standardization Sector, Apr. 2007.

Koike, Yoshinori, "MPLS-TP OAM maintenance points", Draft-koike-idtf-tp-oam-maintenance-points-oo.txt, Oct. 26, 2009.

* cited by examiner

*FIG. 8*

| VLAN ID | INPUT NIF ID | INPUT PORT ID | FLOW ID |
|---|---|---|---|
| VID#1 | NIF#0 | PORT#0 | FLOW ID#1 |
| VID#2 | NIF#1 | PORT#0 | FLOW ID#2 |
| VID#3 | NIF#0 | PORT#0 | FLOW ID#3 |
| VID#4 | NIF#1 | PORT#0 | FLOW ID#4 |
| ⋮ | ⋮ | ⋮ | ⋮ |

| LSP ID1 | LSP ID2 | FLOW ID |
|---|---|---|
| LSP ID#1 | LSP ID#1 | FLOW ID#1 |
| LSP ID#2 | LSP ID#1 | FLOW ID#2 |
| LSP ID#3 | — | FLOW ID#3 |
| LSP ID#4 | — | FLOW ID#4 |
| ⋮ | ⋮ | ⋮ |

| FLOW ID | INPUT NIF ID | INPUT PORT ID | OUTPUT NIF ID | OUTPUT PORT ID |
|---|---|---|---|---|
| FLOW ID#1 | NIF#0 | PORT#0 | NIF#5 | PORT#0 |
| FLOW ID#1 | NIF#1 | PORT#4 | NIF#1 | PORT#1 |
| FLOW ID#2 | NIF#4 | PORT#3 | NIF#5 | PORT#0 |
| FLOW ID#2 | NIF#1 | PORT#2 | NIF#1 | PORT#1 |
| ⋮ | ⋮ | ⋮ | ⋮ | ⋮ |

| FLOW ID | VLAN TAG PROCESS | VLAN TAG |
|---|---|---|
| FLOW ID#1 | ADDITION | VID#1<br>CoS#1 |
| FLOW ID#2 | DELETION | — |
| FLOW ID#3 | TRANSMISSION | — |
| FLOW ID#4 | CONVERSION | VID#4<br>CoS:NOT CHANGED |
| ⋮ | ⋮ | ⋮ |

| FLOW ID | MPLS LABEL PROCESS | MPLS LABEL 1 | MPLS LABEL 2 |
|---|---|---|---|
| FLOW ID#1 | TWO- LABEL ADDITION (ETHERNET HEADER ADDITION) | LSP ID#1 TC#1 | LSP ID#10 TC#1 |
| FLOW ID#2 | ONE- LABEL DELETION | — | — |
| FLOW ID#3 | TRANSMISSION | — | — |
| FLOW ID#4 | ONE- LABEL CONVERSION | LSP ID#40 TC:NOT CHANGED | — |
| ⋮ | ⋮ | ⋮ | ⋮ |

241 244 245 246

COMMUNICATION SYSTEM AND COMMUNICATION DEVICE

TECHNICAL FIELD

The present invention relates to a packet communication system, and more particularly to a communication system in which a loopback test is carried out to verify connectivity of paths and others.

BACKGROUND ART

The leased circuit and public phone service have played an important role for as long as 100 years or more in a mission-critical task of an enterprise and in a field such as national defense in which the mission-critical communication is required.

On the other hand, with the recent rapid increase of communication traffic, a packet-switched network which facilitates the high-speed communication has explosively spread, and the price of the parts thereof has been rapidly decreasing by mass production. Furthermore, in the packet-switched network, by using VPN technology such as MPLS (Multi-Protocol Label Switching), users can be accommodated in the network in which a plurality of users are completely separated logically, and both the cost reduction and the reliable security by sharing of the device can be achieved. Therefore, it has been desired to replace the leased circuit and public phone service whose maintenance cost has been increased due to aging and whose communication speed is difficult to increase with the packet-switched network so as to increase the communication speed and the communication capacity. In response to this, international organizations for standardization such as IETF (Internet Engineering Task Force) and ITU-T (International Telecommunication Union-Telecommunication sector) have started the development of MPLS-TP (MPLS Transport-Profile) as a suitable method for accommodating the conventional leased circuit and public phone service. The MPLS-TP places the greatest emphasis on the reliability which is the biggest disadvantage of the packet-switched network, and the standardization has been developing mainly around OAM (Operation Administration and Maintenance) for fault detection and APS (Automatic Protection Switching) for communication path switching. In particular, OAM which plays a major role on the fault detection and the failure part determination is the technology to be the core of the reliability.

The protocol referred to as MPLS encapsulates the packet with one or plurality of headers called label, and transfers the packet at the sight of only the label at intermediate nodes (LSR: Label Switching Router) in the network. Therefore, the speeding up can be easily achieved in the architecture. In the case of the packet provided with a plurality of labels, LSR of the normal MPLS uses the LSP (Label Switched Path) ID included in the outermost (first) label as a key for transfer. On the other hand, the device (LER: Label Edge Router) to be an edge point of the path identifies the user and the service from the MPLS label added to the packet, delete the label, takes out the payload, and carries out the subsequent processes (transfer, termination and others). As described above, the MPLS is the protocol that connects the LERs to be the edge points of the network with the line (path) through a plurality of LSRs, and the path is designated by the first MPLS label for transfer. MPLS-TP places the greatest emphasis on maintaining compatibility with the MPLS, and the OAM added newly is also designed to comply with this architecture.

The function of OAM is roughly classified into, for example, fault detection, failure part determination, and performance measurement of the network. In particular, in view of the application to the leased circuit service in which high operation ratio is required, it is indispensable to minimize the communication down time due to serious fault that needs repair and replacement of device parts, and the OAM function that promptly determines the fault location plays an important role. The OAM that determines the fault location includes LB (Loop Back), LT (Link Trace), and PT (Path Trace) in which loopback is carried out at the intermediate node to test the connectivity. However, as described above, since the MPLS is the protocol that designates the path (line) in the network, it has a feature that it is difficult to designate the loopback location in the network with a point.

For this reason, in Ping (RFC 4379: Non-Patent Document 1) used in the conventional MPLS and the like, the loopback location is designated by using TTL (Time To Live) existing in the MPLS label for transfer. TTL is originally introduced in order to prevent the packet from infinitely staying in the network when a loop occurs in the network, and the packet is discarded when the packet goes through (hops) a finite counter. Each time when the packet hops LSR, TTL of the first MPLS label for transfer is subtracted by "1", and when it becomes "0", the corresponding packet is discarded in the device. By utilizing this feature, in the conventional Ping of MPLS and Trace Route, TTL of the first MPLS label is set so as to be "0" just at the node where the node which transmits the OAM packet becomes the loopback point, thereby achieving the designation of the loopback point. In LSR to be the loopback point, TTL of the first MPLS label for transfer becomes "0", the packet is discarded. However, in the case of LSR that supports Ping and Trace Route, the packet in which TTL becomes "0" is not simply discarded, but the payload is checked, and when the packet is determined as the Ping or Trace Route packet, the loopback process of the packet is carried out. As described above, in the OAM of the conventional MPLS, the loopback process is realized by using TTL of the first MPLS label for transfer, and the similar method is utilized also in the OAM of MPLS-TP which is now under standardization.

On the other hand, as OAM of T-MPLS (Transport MPLS), the standardization of which has been developing in ITU-T, G.8114 (Non-Patent Document 2) is known (standardization of MPLS-TP is invalidated after the start in IETF). In G.8114, the loopback point is designated by TTL of MPLS label used for OAM identification. The OAM identification label is added inside the transfer label (second and subsequent labels) and has a format similar to that of the MPLS label for transfer, but the LSP ID which shows an ID of normal path is designated fixedly to a reserved value of "14". In G.8114, the loopback point is designated so that the TTL which is the unused field of the OAM label becomes a desired number of hops. Since the TTL of OAM identification label is subtracted by "1" at the point where OAM can be processed, the number of points which support and process the G.8114 at the intermediate node (number of MIP−1) is set as the number of hops. The Non-Patent Document 2 discloses that this MIP is provided for both Ingress and Egress.

Furthermore, in transmission device such as ATM device used for normal leased circuit and public phone service, the loopback point is designated by a unique ID (Location ID) in the network. For example, the paragraph [0014] of the Patent Document 1 discloses that the conduction (loopback) test is carried out by designating the segments 3*a*, 4*a*, and 5*a* in the device (Ingress and Egress can also be separated) of the ATM switch 1 by using the Location ID of the ATM cells. The paragraph [0015] of the Patent Document 1 discloses that the response means 3*b*, 4*b*, and 5*b* of the ATM switch 1 references the Location ID of the loopback OAM cell 6 and sends a response when the identifier shows the segment in the device thereof.

PRIOR ART DOCUMENTS

Patent Documents

Patent Document 1: Japanese Unexamined Patent Application Publication No. 11-122261

NON-PATENT DOCUMENTS

Non-Patent Document 1: IETF RFC 4379 (Detecting Multi-Protocol Label Switched (MPLS) Data Plane Failures)

Non-Patent Document 2: ITU-T Advisory Draft (April, 2007) G.8114 (Operation & Maintenance mechanisms for T-MPLS layer networks)

SUMMARY OF THE INVENTION

Problems to be Solved by the Invention

In the MPLS-TP device, for achieving the reliability and operation ratio equivalent to those of the conventional leased circuit and public phone service, the finer unit for the failure part determination is better, and it is indispensable that the mechanism thereof securely has the compatibility with the conventional MPLS.

From this viewpoint, in the method in which the loopback point is designated by the TTL of the transfer label like the conventional Ping, due to the nature that TTL is subtracted at each hop of the device, the unit which can be designated as the loopback point is fixed to the device unit. Meanwhile, if the input (Ingress) and the output (Egress) of the device can be designated as loopback points, when the loopback fails in Ingress of the device, it can be guessed that the failure occurs in the communication path on the device input side, and an action to secure the new communication path to change the connection to the device is required in the case of the failure in the communication path. On the other hand, when the loopback in Ingress of the device succeeds but the loopback in Egress of the device fails, since it can be determined that inappropriate setting and failure inside the device occur instead of the failure of the communication path, adjustment of the device setting and the part replacement work are prioritized.

Furthermore, if the failure determination unit is the device unit, the restoration works like those have to be carried out simultaneously and parallelly, and the cost is extremely high. In addition, since the restoration resources are dispersed, the restoration time becomes long. Therefore, in the conventional method of designating the loopback point by the TTL of the transfer label, it is difficult to construct the highly reliable network.

However, since the loopback point is designated in G.8114 by using TTL of OAM identification label, which is the field which is not referenced by LSR of the normal MPLS, it cannot be applied to MPLS-TP OAM. As a concrete problem, the function called PHP (Penultimate Hop Popping), in which the transfer label is deleted in the LSR on the former stage of LER serving as the termination device of the path and the process is carried out in LER with reference to only the second and subsequent labels or payload inside the transfer label, is specified in the conventional MPLS. Accordingly, since processes such as the analysis and the research of the transfer label can be omitted in the LER, it has the advantage that the mounting of the device is very easy, and thus this function is widely prevalent. Therefore, on the assumption of the PHP, TTL of the OAM identification label is determined by standardization so as to be "1" in MPLS-TP. This is because the effect that the processing glitch such as transfer is prevented by TTL of "1" is expected even if the packet of only the OAM identification label flows into LER due to PHP. Accordingly, the method of G.8114 has a large problem in the compatibility with the conventional MPLS. Also, in the method of G.8114, the process of referencing the inner OAM label other than the transfer label is required in order to determine whether the packet is the loopback packet in all the transfer devices, and this prevents the high-speed transfer process.

In addition, in the method described in the Patent Document 1 (other than MPLS device mentioned above), when it is determined whether the packet is looped back at the device itself, the process up to the analysis of the payload of the ATM cell is required. However, in the MPLS and MPLS-TP in which the variable-length packet process is indispensable, if the transfer process has to be carried out after the process up to the payload analysis has been carried out on the LSR, since the serious problem occurs in the speeding up and the compatibility with the conventional LSR which carries out the packet relay only by the first label cannot be secured, its application is impossible.

For the reasons described above, both the designation of the loopback point in finer units such as Ingress and Egress of the device like the leased circuit and public phone service and the maintenance of the compatibility with various existing processes of the conventional MPLS have to be simultaneously achieved for OAM of MPLS-TP.

Means for Solving the Problems

For the solution of the problems described above, a packet communication system of the present invention is a communication system which is provided with a plurality of communication devices and transfers a packet between the plurality of communication devices through a communication path, and it is characterized in that, when a packet is looped back at any of the communication devices on the communication path to verify connectivity of the communication path, a first communication device of the plurality of communication devices stores, in a first region of header information of the packet, first information for designating the communication device at which the packet is looped back, further stores, in a second region of the header information of the packet, second information on a loopback point in the designated communication device at which the packet is looped back, and sends the packet to which the first information and the second information have been added.

Effects of the Invention

In this manner, the connectivity verification test can be carried out with designating an input side and an output side of the communication device. Further, in addition to the fact that the compatibility with the conventional devices of MPLS and MPLS-TP to which the present invention is not applied can be maintained, the cutout accuracy of the failure location is improved, and the cost and time required for the repair and replacement of the device can be reduced. As a result, since the communication carrier can make smooth transition from the current MPLS to the MPLS-TP and the service outage due to communication down can be reduced, it becomes possible to provide the extremely highly reliable service to user.

BRIEF DESCRIPTIONS OF THE DRAWINGS

FIG. 8 is a diagram showing a header processing table in the case of the Ethernet process provided in the input header processing section 103 in FIG. 6;

FIG. 9 is a diagram showing a header processing table in the case of the MPLS process provided in the input header processing section 103 in FIG. 6;

FIG. 10 is a diagram showing a frame transfer table provided in the switch section 11 in FIG. 6;

FIG. 11 is a diagram showing a header processing table in the case of the Ethernet process provided in the output header processing section 106 in FIG. 6;

FIG. 12 is a diagram showing a header processing table in the case of the MPLS process provided in the output header processing section 106 in FIG. 6;

BEST MODE FOR CARRYING OUT THE INVENTION

Hereinafter, embodiments of the present invention will be described with reference to the accompanying drawings.

First Embodiment

Figure 1:
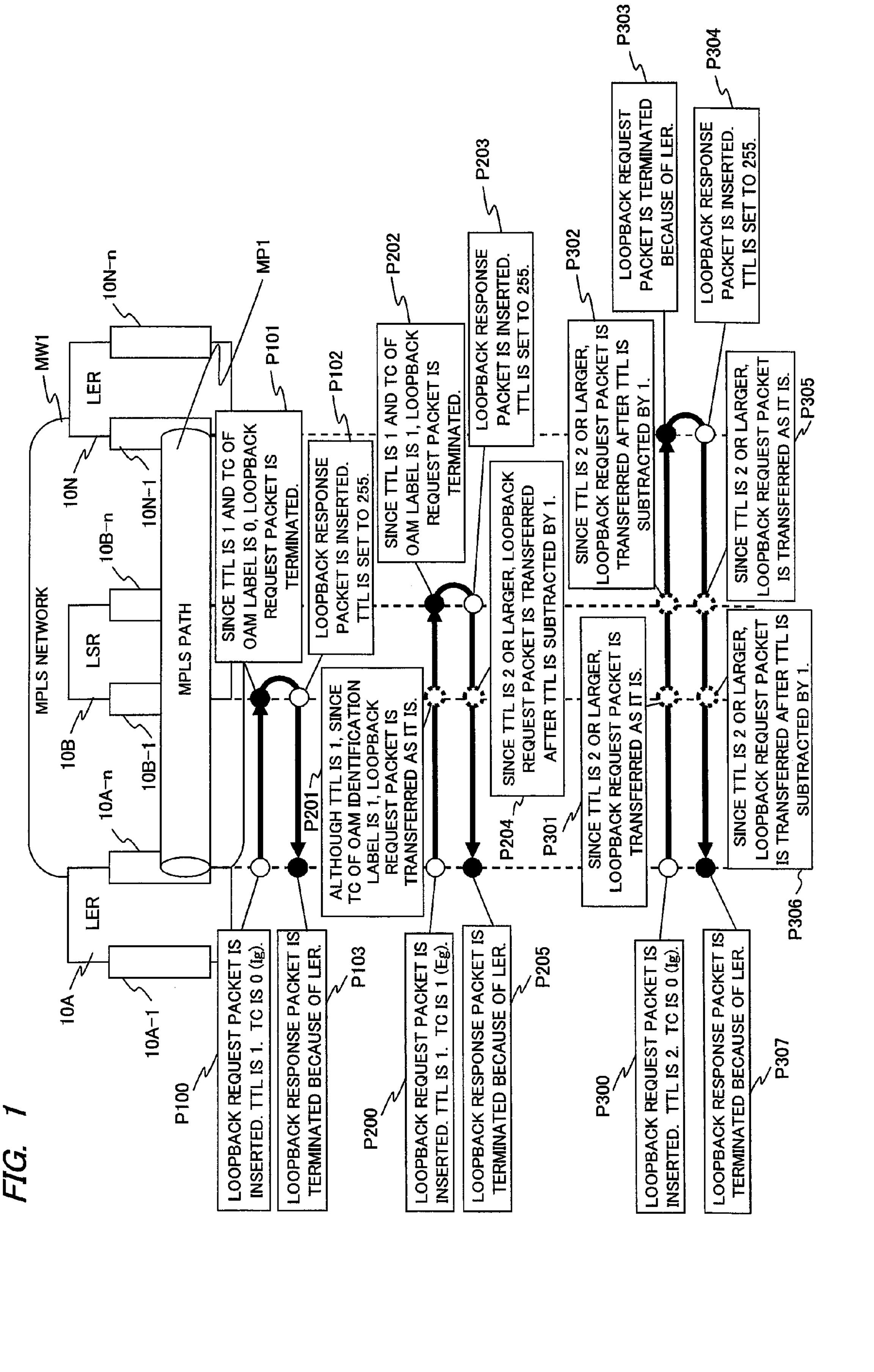
FIG. 1 is a diagram showing an example of a loopback test in a communication system of the present invention.

FIG. 1 shows an example of loopback test using an OAM packet in the communication system of the present invention.

As the communication device of this embodiment, an edge device (LER) and a relay device (LSR) of a MPLS network MW1 have the same device configuration, and the device is operated as LER or LSR depending on the previous setting and the input packet. In FIG. 1, communication devices 10A and 10N are operated as LER and a communication device 10B is operated as LSR in consideration of the positions on the MPLS network as a matter of convenience.

FIG. 1 shows a sequence of carrying out a test by looping back a loopback OAM packet from a loopback point in a MPLS network MW1 designated by the communication device 10A in order to check the connectivity of a MPLS path MP1.

Firstly, the process flow in the case where an Ingress side of an interface (NIF) 10B-1 of the communication device 10B which is one hop from the communication device 10A is taken as a loopback point of the loopback OAM packet will be described.

A loopback request OAM packet 42 is first inserted from the communication device 10A (P100). At this time, a manager (operator) of the communication device 10A designates a loopback point and a user to be tested, and an execution instruction of the loopback test is executed to the communication device 10A. When the communication device 10A receives this instruction, an insertion process is carried out by following functional blocks shown in FIG. 6. A node manager 12 designates an insertion port 101-*n*, a loopback point, and a user to be an insertion target to a NIF manager 110 on a NIF 10B-1 to be inserted, and then issues an insertion instruction. The NIF manager 110 which has received it generates an OAM packet and issues an insertion request to an output scheduler 108, and the OAM packet is inserted. Note that a packet format of the OAM packet is shown in FIG. 5 and will be described later. In the loopback request OAM packet 42, as a transfer MPLS label (shown in FIG. 4) 414-1, ID showing a MPLS path MP1 is added to LSP ID: 4141, a default value (which may be an arbitrary value in this embodiment) is added to TC: 4142, '0' is added to a S bit 4143, and '1' is added to TTL: 4144. Also, as a user identification MPLS label 414-2, ID showing a user is added to LSP ID: 4141, a default value (which may be an arbitrary value in this embodiment) is added to TC: 4142, '0' is added to a S bit 4143, and a default value (which may be an arbitrary value in this embodiment) is added to TTL: 4144. Furthermore, as an OAM identification MPLS label 414-3, ID showing an OAM (for example, "14") is added to LSP ID: 4141, '0' is added to TC: 4142, '1' is added to a S bit 4143, and a default value (which may be an arbitrary value in this embodiment) is added to TTL: 4144. A payload section 424 is a field including information showing that the packet is the loopback request OAM packet. By this means, the communication device 10B which is LSR being one hop from the communication device 10A is designated as the loopback device by the TTL: 4144 of the transfer MPLS label 414-1, and the NIF: 10B-1 on the Ingress side of the communication device 10B is designated as the loopback point by the TC: 4142 of the OAM identification MPLS label 414-3.

When this loopback request OAM packet 42 reaches the Ingress side of the NIF: 10B-1 of the communication device 10B, the analysis of the transfer MPLS label 414-1 is first carried out. Since TTL: 4144 is '1', it is determined that discard or loopback process is necessary in the device itself, and the analysis of the OAM identification MPLS label 414-3 is carried out. Since TC: 4142 is '0', it is determined that there is a possibility of the loopback on the Ingress side, and the loopback request packet is terminated (P101). The details will be shown in FIG. 15.

Subsequently, a loopback response OAM packet 42 obtained by rewriting only a necessary part of the loopback request OAM packet is transmitted from 10B-1 to the communication device 10A (P102). In particular, regions to be rewritten are LSP ID 4141, the payload section 424, and TTL: 4144 of the transfer MPLS label 414-1, and the LSP ID: 4141 is changed so as to designate a reverse method of the MPLS path MP1 for loopback and the payload section 424 is changed to the information showing the loopback response OAM packet. In addition, it is important to set the TTL: 4144 of the transfer MPLS label 414-1 to "255" (maximum value) so as to surely return the packet to the communication device 10A.

Then, when the communication device 10A receives the loopback response OAM packet 42, the communication device 10A carries out the analysis of each MPLS label and payload section regardless of the TTL: 4144 of the transfer MPLS label 414-1 to determine that the packet is the loopback response OAM packet to the MPLS path MP1 set to the device itself, and then terminates the packet (P103). The details will be shown in FIG. 13 and FIG. 14. In this manner, the loopback test on the Ingress side of the NIF: 10B-1 of the communication device 10B serving as LSR is completed.

Secondly, the process flow in the case where an Egress side of NIF: 10B-n of the communication device 10B which is one hop from the communication device 10A is taken as a loopback point of the loopback OAM packet will be described.

A loopback request OAM packet 42 is first inserted from the communication device 10A (P200). In the loopback request OAM packet 42, as a transfer MPLS label 414-1, ID showing a MPLS path MP1 is added to LSP ID: 4141, a default value (which may be an arbitrary value in this embodiment) is added to TC: 4142, '0' is added to a S bit 4143, and '1' is added to TTL: 4144. Also, as a user identification MPLS label 414-2, ID showing a user is added to LSP ID: 4141, a default value (which may be an arbitrary value in this embodiment) is added to TC: 4142, '0' is added to a S bit 4143, and a default value (which may be an arbitrary value in this embodiment) is added to TTL: 4144. Furthermore, as an OAM identification MPLS label 414-3, ID showing an OAM (for example, "14") is added to LSP ID: 4141, '1' is added to TC: 4142, '1' is added to a S bit 4143, and a default value (which may be an arbitrary value in this embodiment) is added to TTL: 4144. The payload section 424 is a field including information showing that the packet is the loopback request OAM packet. By this means, the communication device 10B which is LSR being one hop from the communication device 10A is designated as the loopback device of the loopback request OAM packet by the TTL: 4144 of the transfer MPLS label 414-1, and the NIF: 10B-n on the Egress side of the communication device 10B is designated as the loopback point of the loopback request OAM packet by the TC: 4142 of the OAM identification MPLS label 414-3.

When this loopback request OAM packet 42 reaches the Ingress side of the NIF: 10B-1 of the communication device 10B, the analysis of the transfer MPLS label 414-1 is first carried out. Since TTL: 4144 is '1', it is determined that discard or loopback process is necessary in the device itself, and the analysis of the OAM identification MPLS label 414-3 is carried out. Since TC: 4142 is '1', the Ingress side loopback is not executed, and the loopback request OAM packet is transferred (P201).

When this transferred loopback request OAM packet 42 reaches the Egress side of the NIF: 10B-2 of the communication device 10B, the analysis of the transfer MPLS label 414-1 is carried out. Since TTL: 4144 is '1', it is determined that discard or loopback process is necessary in the device itself, and the analysis of the OAM identification MPLS label 414-3 is carried out. Since TC: 4142 is '1', it is determined that there is a possibility of the loopback on the Egress side, and the loopback request packet is terminated (P202).

Subsequently, the insertion process of the loopback response OAM packet 42 similar to that of P102 is carried out (P203).

Next, when the loopback response OAM packet 42 reaches the Egress side of the NIF: 10B-1, since the TTL: 4144 of the transfer MPLS label 414-1 is "2" or more, the TTL is subtracted by '1', and the packet is transferred (P204).

Then, the communication device 10A carries out the reception process of the loopback response OAM packet 42 similar to P103 (P205). In this manner, the loopback test on the Egress side of the NIF: 10B-2 of the communication device 10B serving as LSR is completed.

Finally, the process flow in the case where an Ingress side of NIF: 10N-1 of the communication device 10N which is two hops from the communication device 10A is taken as a loopback point of the loopback OAM packet will be described.

A loopback OAM packet 42 is first inserted from the communication device 10A (P300). In the loopback OAM packet 42, as a transfer MPLS label 414-1, ID showing a MPLS path MP1 is added to LSP ID: 4141, a default value (which may be an arbitrary value in this embodiment) is added to TC: 4142, '0' is added to a S bit 4143, and '2' is added to TTL: 4144. Also, as a user identification MPLS label 414-2, ID showing a user is added to LSP ID: 4141, a default value (which may be an arbitrary value in this embodiment) is added to TC: 4142, '0' is added to a S bit 4143, and a default value (which may be an arbitrary value in this embodiment) is added to TTL: 4144. Furthermore, as an OAM identification MPLS label 414-3, ID showing an OAM (for example, "14") is added to LSP ID: 4141, '0' is added to TC: 4142, '1' is added to a S bit 4143, and a default value (which may be an arbitrary value in this embodiment) is added to TTL: 4144. The payload section 424 is a field including information showing that the packet is the loopback request OAM packet. By this means, the communication device 10N which is LSR being two hops from the communication device 10A is designated as the loopback device of the loopback request OAM packet by the TTL: 4144 of the transfer MPLS label 414-1, and the NIF: 10N-1 on the Ingress side of the communication device 10N is designated as the loopback point of the loopback request OAM packet by the TC: 4142 of the OAM identification MPLS label 414-3.

When this loopback request OAM packet 42 reaches the Ingress side of the NIF: 10B-1 of the communication device 10B, the analysis of the transfer MPLS label 414-1 is first carried out. Since TTL: 4144 is '2' or larger, the loopback request OAM packet is transferred (P301).

When this transferred loopback request OAM packet 42 reaches the Egress side of the NIF: 10B-n of the communication device 10B, the communication device 10B carries out the same process as P204, and the loopback request OAM packet 42 is transferred (P302).

When this transferred loopback request OAM packet 42 reaches the Ingress side of the NIF: 10N-1 of the communication device 10N, the communication device 10N carries out the analysis of each MPLS label and payload section regardless of the TTL: 4144 of the transfer MPLS label 414-1 to determine that the packet is the loopback request OAM packet to the MPLS path MP1 set to the device itself, and then terminates the packet (P303).

Subsequently, the communication device 10N carries out the insertion process of the loopback response OAM packet 42 similar to P102 (P304).

When this loopback response OAM packet 42 reaches the Ingress side of the NIF: 10B-n of the communication device 10B, the communication device 10B carries out the same process as P301 to the loopback response OAM packet 42, and the loopback response OAM packet 42 is transferred (P305).

Subsequently, when the loopback response OAM packet 42 reaches the Egress side of the NIF: 10B-1 of the communication device 10B, the communication device 10B carries out the same process as P204 to the loopback response OAM packet 42, and the loopback response OAM packet 42 is transferred (P306).

Then, the communication device 10A carries out the reception process of the loopback response OAM packet 42 similar to P103 (P307). In this manner, the loopback test on the Ingress side of the NIF: 10N-1 of the communication device 10N serving as LER is completed.

In this manner, the connectivity verification test can be carried out with designating an input side and an output side of the communication device by using the TTL of the transfer MPLS label and other header information.

Figure 2:
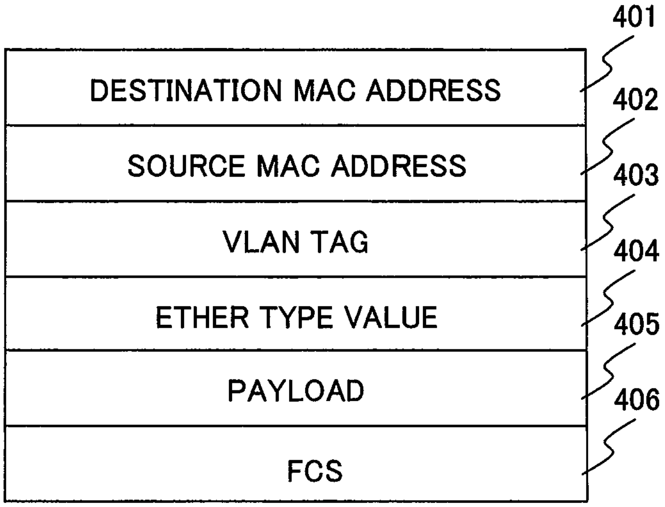
FIG. 2 is a diagram showing a format of the Ethernet communication packet flowing in the communication system of the present invention.

FIG. 2 shows a format of a communication packet 40 which the communication device 10N receives from outside of the MPLS network MW1 in this embodiment.

The communication packet 40 is made up of a MAC header including a destination MAC address 401, a source MAC address 402, a VLAN tag 403, and a type value 404 showing a type of a subsequent header, a payload section 405, and a packet check sequence (FCS) 406.

MAC address of the LER 10N is stored in the destination MAC address 401 and the source MAC address 402. The VLAN tag 403 shows a value of a VLAN ID serving as a flow identifier.

Figure 3:
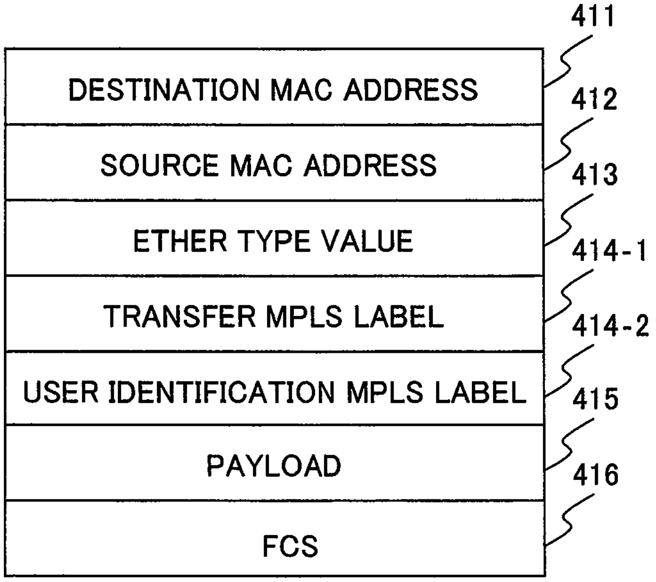
FIG. 3 is a diagram showing a format of the MPLS communication packet flowing in the communication system of the present invention.

FIG. 3 shows a format of a communication packet 41 which the communication device 10N transmits and receives in the MPLS network MW1. In this embodiment, a Martini format used when the Ethernet is accommodated by using MPLS-TP is assumed.

The communication packet 41 is made up of a MAC header including a destination MAC address 411, a source MAC address 412, and a type value 413 showing a type of a subsequent header, a transfer MPLS label 414-1, a user identification MPLS label 414-2, a payload section 415, and a FCS: 416. An Ether packet of the communication packet 40 shown in FIG. 2 is encapsulated in the payload section 415. This Martini format has two MPLS labels, and the first MPLS label 414-1 (transfer MPLS label) shows the transfer path in the network and the second MPLS label 414-2 (user identification MPLS label) is used as the label for Psudo Wire for identifying a user and a service.

Figure 4:
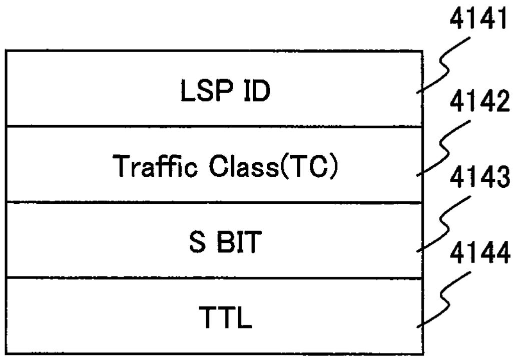
FIG. 4 is a diagram showing a format of the MPLS label flowing in the communication system of the present invention.
Figure 5:
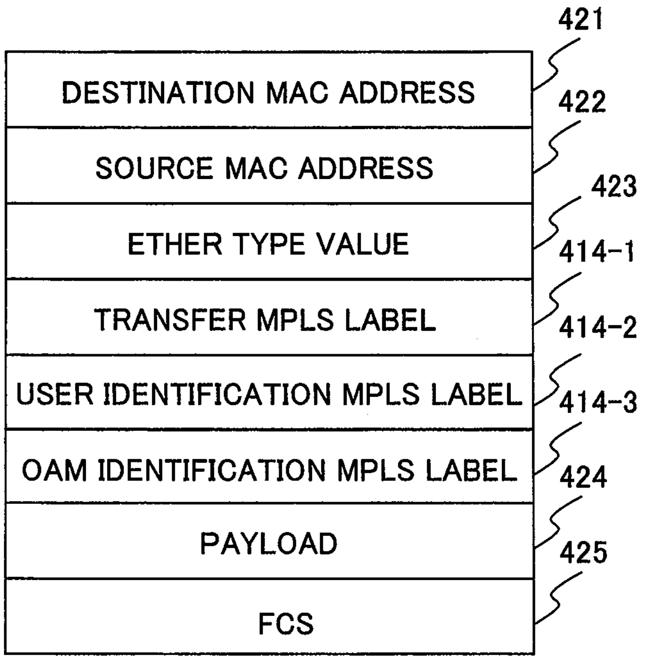
FIG. 5 is a diagram showing a format of the MPLS OAM communication packet flowing in the communication system of the present invention.

FIG. 4 shows a format of the MPLS label 414 shown in FIG. 3.

The MPLS label 414 is made up of LSP ID: 4141 showing a MPLS path and a user ID, a Traffic Class (TC) 4142 showing the transfer priority, a S bit 4143 showing the final MPLS label, and the TTL: 4144 used for preventing loop. This format is the same in the transfer MPLS label 414-1 and the user identification MPLS label 414-2.

FIG. 5 shows a format of the OAM packet 42 which the communication device 10N transmits and receives in the MPLS network MW1.

The OAM packet 42 is made up of a MAC header including a destination MAC address 421, a source MAC address 422, and a type value 423 showing a type of a subsequent header, a transfer MPLS label 414-1, a user identification MPLS label 414-2, an OAM identification MPLS label 414-3, a payload section 424, and a FCS 425. Information exclusive for OAM is stored in the payload section 424. This figure shows an OAM packet for user, and the OAM identification MPLS label is provided after the two MPLS labels. In the case of the OAM packet used on the transfer path instead of the packet for user, the OAM identification MPLS label is disposed after the transfer MPLS label 414-1.

Figure 6:
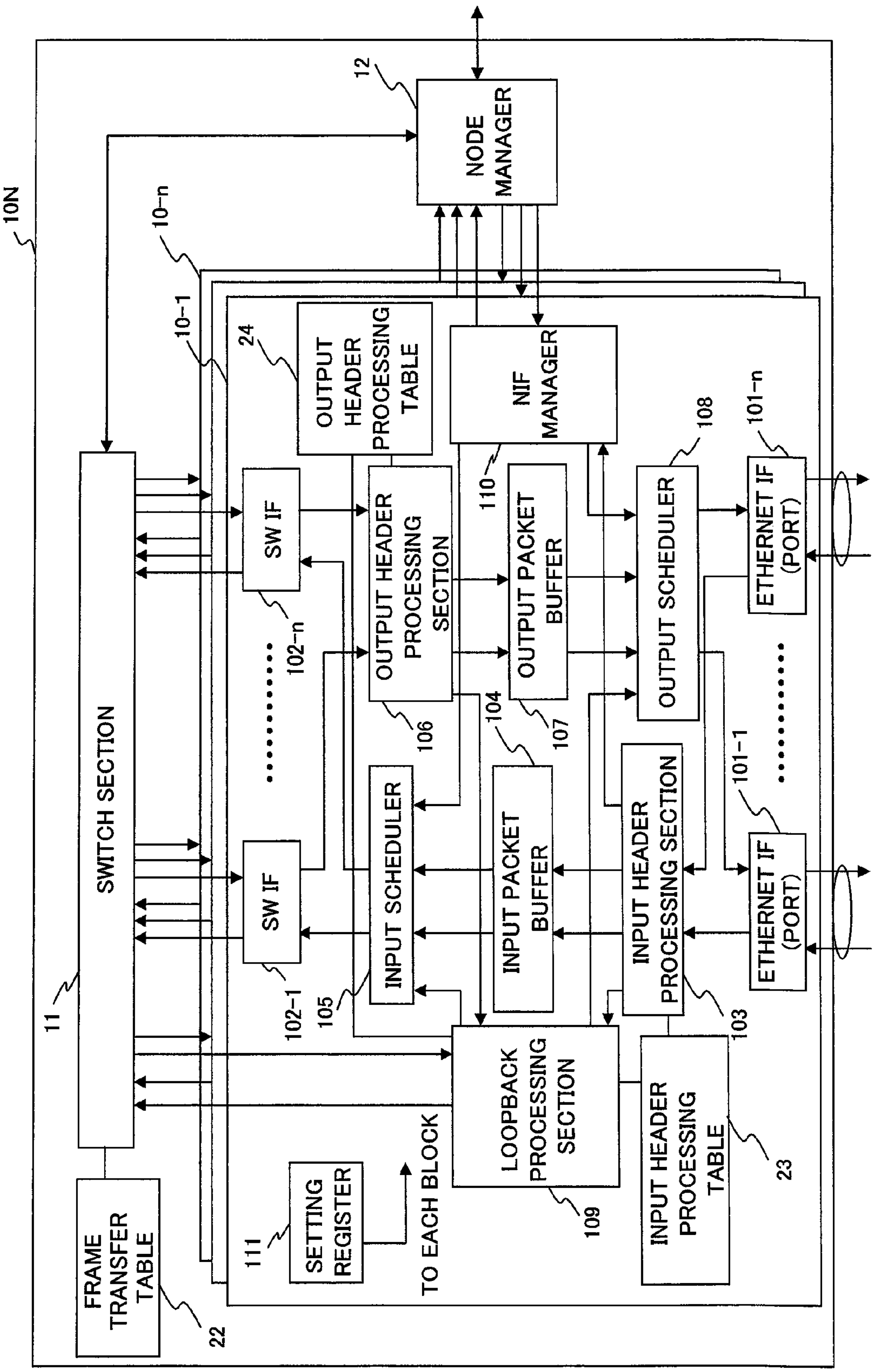
FIG. 6 is a block diagram showing the configuration of the communication device 10N.

FIG. 6 shows the configuration of the communication device 10N.

The communication device 10N is made up of a plurality of network interface boards (NIF) 10 (10-1 to 10-*n*), a switch section 11 connected to these NIFs, and the node manager 12 which manages the entire device.

Each NIF: 10 is provided with a plurality of input/output line interfaces 101 (101-1 to 101-*n*) serving as communication ports and is connected to other devices through these communication ports. In this embodiment, the input/output line interface 101 is a line interface for Ethernet (registered trademark). Note that the input/output line interface 101 is not limited to the line interface for Ethernet (registered trademark).

Each NIF: 10 includes an input header processing section 103 connected to these input/output line interfaces 101, an input packet buffer 104 connected to the input header processing section 103, and an input scheduler 105 connected to the input packet buffer 104. Also, each NIF: 10 includes a plurality of SW interfaces 102 (102-1 to 102-*n*) connected to the switch section 11, an output packet header processing section 106 connected to these SW interfaces, an output packet buffer 107 connected to the output packet header processing section 106, and an output scheduler 108 connected to the output packet buffer 107.

Here, the SW interface 102-*i* corresponds to the input/output line interface 101-*i*, and the input packet received by the input/output line interface 101-*i* is transferred to the switch section 11 through the SW interface 102-*i*. Also, the output packet sorted from the switch section 11 to the SW interface 102-*i* is sent to an output line through the input/output line interface 101-*i*. Therefore, the input header processing section 103, the input packet buffer 104, the input scheduler 105, the output header processing section 106, the output packet buffer 107, and the output header processing section 108 have independent structures for each line, and the packets of each line are not mixed.

Figure 7:
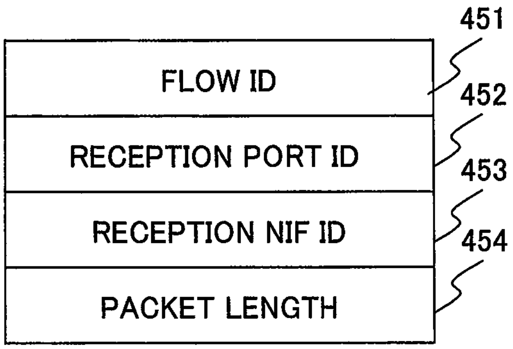
FIG. 7 is a diagram showing a format of a device header added to an input packet of the communication device 10N.

When the input/output line interface 101-*i* receives the communication packet 40 or 41 or the OAM packet 42 from the input line, it adds a device header 45 shown in FIG. 7 to the received packet. The device header 45 is made up of a plurality of fields showing a flow ID: 451, a reception port ID: 452, a reception NIF ID: 453, and a packet length 454.

At the time when the input/output line interface 101-*i* adds the device header 45 to the received packet, the IDs of the port and NIF acquired from a setting register 111 are stored in the reception port ID: 452 and the NIF ID: 453, respectively. On the other hand, the flow ID: 451 is blank. An effective value is set to this field by the input header processing section 103.

The input header processing section 103 carries out the input header process S100 described later and adds the flow ID: 451 to the device header 45 of each input packet with reference to the input header processing table 23, and other header processes are carried out. As a result of the input header process S100, the input packet is stored for each line in the loopback processing section 109 or the input packet buffer 104 or discarded. Here, the setting of the input header processing table 23 differs between the mode for processing the Ethernet of the communication packet 40 and the mode for processing the MPLS of the communication packets 41 and 42 as shown below. The processing mode is designated by the setting register 111.

FIG. 8 shows the input header processing table 23 in the case where the Ethernet processing mode is set to the setting register 111. The input header processing table 23 in the case of the Ethernet processing is provided for searching a table entry showing the flow ID: 234 with using the combination of the VLAN ID: 231, the input NIF ID: 232, and the input port ID: 233 as a search key. Here, the flow ID: 234 is an ID for specifying each flow in the communication device 10N, and the same ID is used for both directions.

On the other hand, FIG. 9 shows the input header processing table 23 in the case where the MPLS processing mode is set to the setting register 111. The input header processing table 23 in the case of the MPLS processing is provided for searching a table entry showing the flow ID: 234 with using the combination of the LSP ID1: 235 and the LSP ID2: 236 as a search key. Here, the LSP ID: 4141 stored in the first MPLS label: 414-1 added to the received packet is set to the LSP ID1: 235, and the LSP ID: 4141 stored in the second MPLS label: 414-2 added to the received packet is set to the LSP ID2: 236. When both the transfer MPLS label 414-1 and the user identification MPLS label 414-2 are identified by the device like LER, the input header processing table 23 is searched by the combination of both the transfer MPLS label 414-1 and the user identification MPLS label 414-2. On the other hand, when only the transfer MPLS label 414-1 is identified by the communication device like LSR, the input header processing table 23 is searched by only the transfer MPLS label 414-1. In this manner, the flow ID of the device header is determined from the MPLS label.

When the packet is stored in the input packet buffer 104, the input scheduler 105 reads it independently for each line to output it to the SW interfaces 102-1 to 102-*n* corresponding to the lines. Furthermore, the input scheduler 105 makes scheduling for reading the insertion packet from the loopback processing section 109 and the packet from the input packet buffer 104. The insertion packet is a loopback response OAM packet inserted from the loopback processing section 109.

The switch section 11 receives the input packet from the SW interfaces 102-1 to 102-*n* of each NIF, specifies the output NIF and the output port ID from a frame transfer table 22, and outputs the packet to the corresponding SW interface 102-*i* as the output packet.

FIG. 10 shows the frame transfer table 22. The frame transfer table 22 is provided for searching a table entry showing the output NIF ID: 224 and the output port ID: 225 with using the combination of the flow ID: 221, the input NIF ID: 222, and the input port ID: 223 as a search key. Here, the input NIF ID: 222 and the input port ID: 223 are fixedly and physically allocated to each SW interface of each NIF, and they can be uniquely determined based on which SW interface the input packet is received from. The switch section 11 searches the frame transfer table 22 therewith.

The output packet which each SW interface 102 receives is sequentially supplied to the output header processing section 106.

The output header processing section 106 carries out the output header process S400 described later and carries out the header process of each output packet with reference to the output header processing table 24. As a result of the output header process S400, the output packet is stored for each line in the loopback processing section 109 or the output packet buffer 107 or discarded. Here, the setting of the output header processing table 24 differs between the mode for processing the Ethernet of the communication packet 40 and the mode for processing the MPLS of the communication packets 41 and 42 as shown below. The processing mode is designated by the setting register 111.

FIG. 11 shows the output header processing table 24 in the case where the Ethernet processing mode is set to the setting register 111. The output header processing table 24 in the case of the Ethernet processing is provided for searching a table entry showing the VLAN tag process 242 and the VLAN tag 243 with using the flow ID: 241 as a search key. Here, the VLAN tag process 242 designates the VLAN tag for the output packet and tag information required for it is set to the VLAN tag 243.

On the other hand, FIG. 12 shows the output header processing table 24 in the case where the MPLS processing mode is set to the setting register 111. The output header processing table 24 in the case of the MPLS process is provided for searching a table entry showing the MPLS label process 244, the MPLS label 1: 245, and the MPLS label 2: 246 with using the flow ID: 241 as a search key. Here, the MPLS label process 244 designates the process for the transfer MPLS label 414-1 and the user identification MPLS label 414-2 of the output packet and tag information required for them is set to the MPLS label 1: 245 and the MPLS label 2: 246. When both the transfer MPLS label 414-1 and the user identification MPLS label 414-2 are added by the device like LER, since the transfer MPLS label 414-1 and the user identification MPLS label 414-2 are added to the output header processing table 24, two-label addition is set to the MPLS label process 244. In this case, the destination MAC address 411, the source MAC address 412, and the Ether type value 413 are further added. At this time, the destination MAC address 411 and the source MAC address 412 may be written over the value set to the setting register 111 for each port or may be written over the value registered for each flow ID in the input header processing table 23. However, when the value fixedly set to the device for each port is overwritten, the destination MAC address has to be a multicast address. Also, an Ether type value showing the MPLS set to the setting register 111 is stored in the Ether type value 413. On the other hand, when only the transfer MPLS label 414-1 is processed in the device like LSR, setting to process only the transfer MPLS label 414-1 such as one-label conversion, one-label deletion, or transmission is set to the output header processing table 24.

When a packet is stored in the output packet buffer 107, the output scheduler 108 independently reads it for each line to output it to the input/output line interface 101 corresponding to the line. Furthermore, the output scheduler 108 makes scheduling for reading the insertion packet from the loopback processing section 109 and the NIF manager 110 and the packet from the output packet buffer 107. The insertion packet is a loopback response OAM packet inserted from the loopback processing section 109 and a loopback request OAM packet inserted from the NIF manager 110. In other words, the loopback test is started from the NIF manager 110. At this time, the NIF manager 110 receives an insertion instruction of the loopback request OAM packet from the node manager 12 and inserts the packet to the output scheduler 108 so as to be output to the port corresponding to the reception port ID: 453 of the device header 45. The input/output line interface 101 deletes the device header 45 from the received output packet, and sends the output packet to the output line with the format shown in FIG. 2, FIG. 3, and FIG. 5.

The loopback processing section 109 executes the loopback process S600 described later for the rewrite of the MPLS label and the rewrite of the payload required for the response to the loopback request OAM packet received from the input header processing section 103 or the output header processing section 106. As a result of the loopback process S600, the loopback response OAM packet is inserted to each scheduler.

Figure 13:
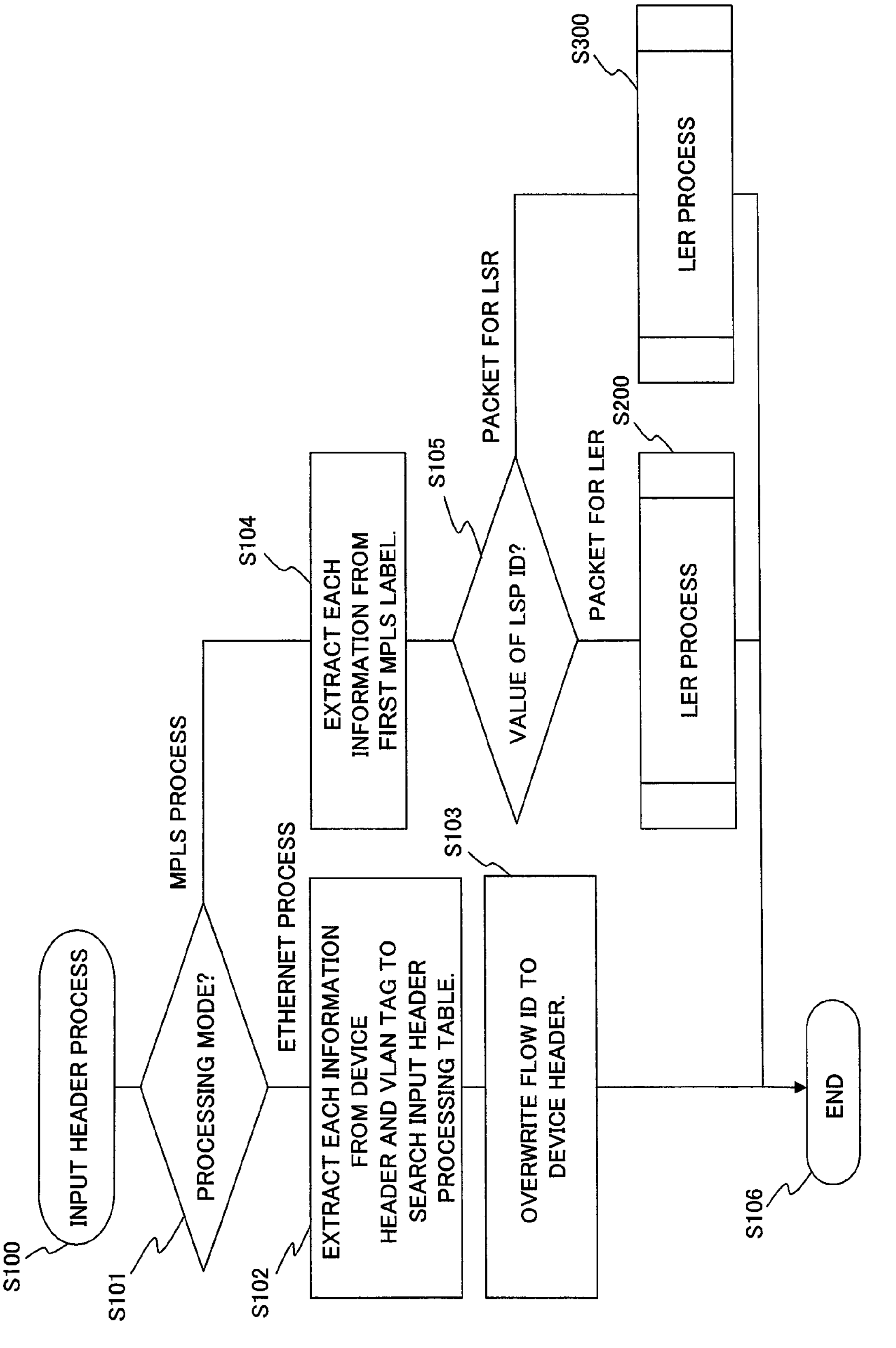
FIG. 13 is a flowchart of the input header process S100 executed by the input header processing section 103 in FIG. 6.

FIG. 13 shows a flowchart of the input header process S100 executed by the input header processing section 103.

The input header processing section 103 determines the processing mode set to the setting register 111 (S101), and when the Ethernet process is set, it extracts each information from the device header 45 and the VLAN tag 403 and searches the input header processing table 23 by using the extracted reception port ID: 452, the reception NIF ID: 453, and VID (S102). Then, it writes the flow ID: 234 which can be acquired as a result of the research to the device header 45 (S103), thereby ending the process (S106).

On the other hand, when the MPLS process is set to the setting register 111 in S101 above, each information is extracted from the first MPLS label (S104) to determine from the value of the extracted LSP ID: 4141 whether the process is the LER process or the LSR process (S105). This determination method may be carried out based on a certain range set to the setting register 111 or the attribute of each LSP ID: 4141 may be set to the setting register 111. When it is determined that the packet is the LER process packet in S105 above, the LER process S200 is executed, and when it is determined that the packet is the LSR process packet, the LSR process S300 is executed, thereby ending the input header process (S106).

Figure 14:
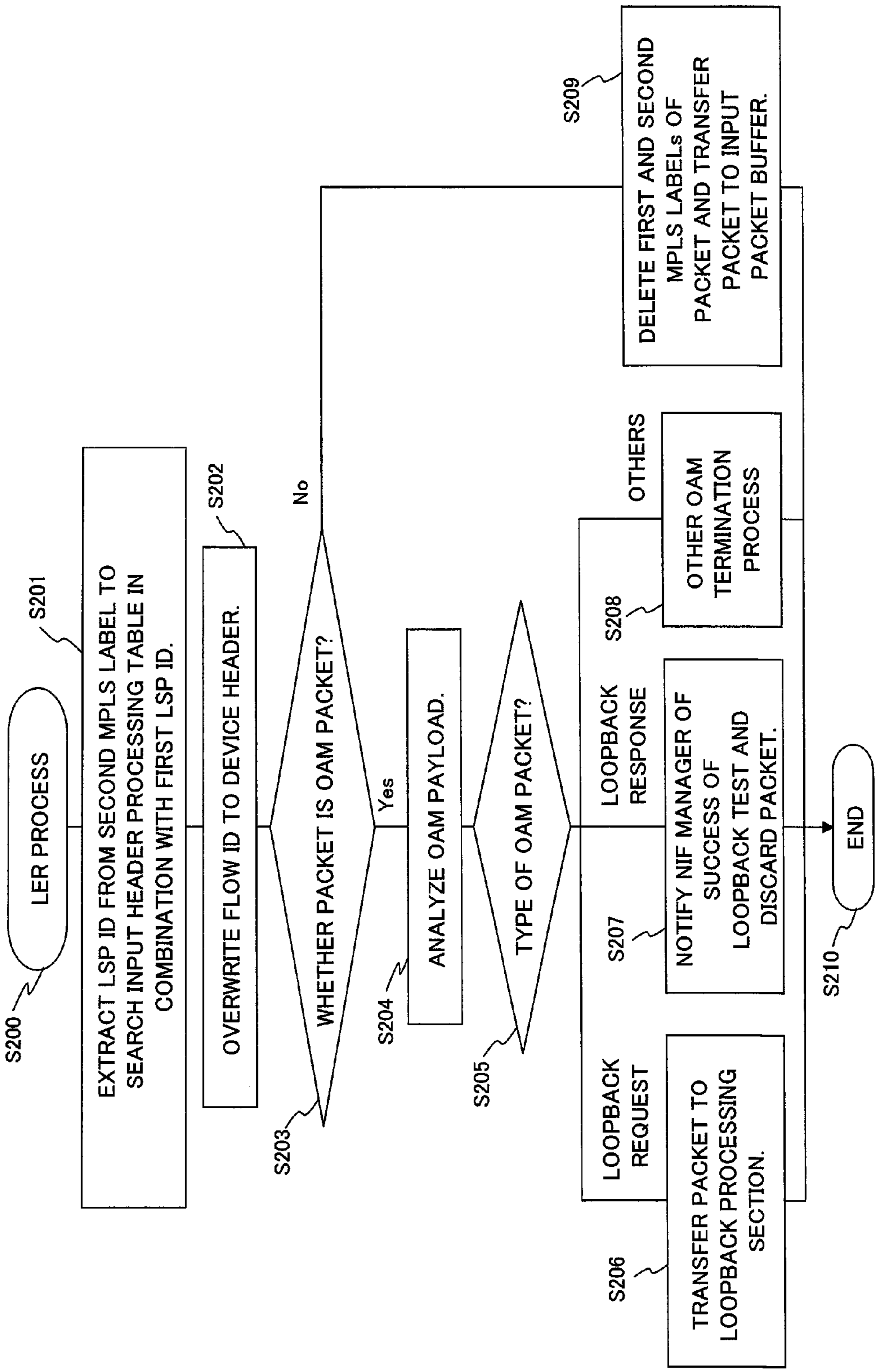
FIG. 14 is a flowchart of the LSR process S200 executed by the input header processing section 103 in FIG. 6.

The LER process of the input header processing section 103 will be described with reference to the flowchart of FIG. 14. In the LER process S200, the input header processing section 103 extracts the LSP ID: 4141 from the second user identification MPLS label 414-2 and searches the input header processing table 23 in combination with the LSP ID: 4141 of the first transfer MPLS label 414-1 (S201). As a result, the flow ID: 234 is acquired to overwrite it to the device header 45 (S202). Then, it checks whether the S bit of the user identification MPLS label 414-2 is ‘0’ (there is MPLS label on the third stage) and the LSP ID: 4141 thereof is the ID showing the OAM (for example, “14”) to determine whether the packet is an OAM packet or not (S203). As a result of this determination, when it is determined that the packet is an OAM packet, the OAM payload is analyzed (S204) to determine the type of the OAM packet (S205). When it is determined that the packet is a loopback request OAM packet as a result of this determination, the packet is transferred to the loopback processing section 109 (S206), thereby ending the process (S210). When it is determined that the packet is a loopback response packet in S205 above, the success of the loopback test is notified to the NIF manager 110, and the packet is discarded (S207), thereby ending the process (S210). When it is determined that the packet is other OAM packet in S205 above, the other OAM packet termination process is executed (S208), thereby ending the process (S210).

When it is determined that the packet is not an OAM packet in S203 above, the transfer MPLS label 414-1 and the user identification MPLS label 414-2 of the packet are deleted and the packet is transferred to the input packet buffer 104 (S209), thereby ending the process (S210).

Figure 15:
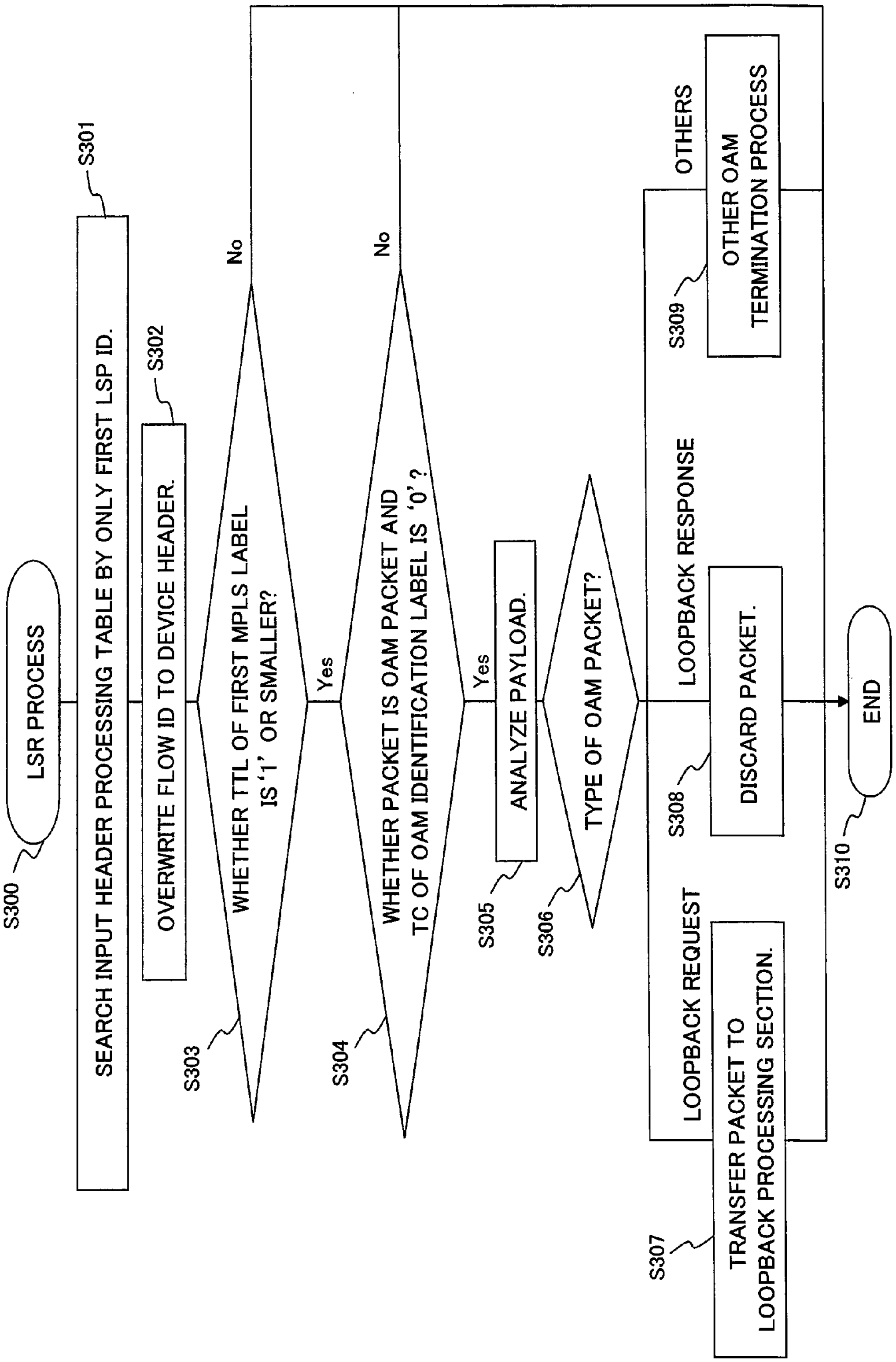
FIG. 15 is a flowchart of the LER process S300 executed by the input header processing section 103 in FIG. 6.

The LSR process of the input header processing section 103 will be described with reference to the flowchart of FIG. 15. In the LSR process S300, the input header processing table 23 is searched by using only the LSP ID: 4141 of the first transfer MPLS label 414-1 (S301). As a result, the flow ID: 234 is acquired, and it is overwritten to the device header 45 (S302). Then, it is determined whether the TTL: 4144 of the transfer MPLS label 414-1 is ‘1’ or smaller (S303), and when it is larger than ‘1’, the process is ended as it is (S310). On the other hand, when TTL: 4144 of the transfer MPLS label 414-1 is ‘1’ or smaller in S303, it is checked whether the S bit of the user identification MPLS label 414-2 is ‘0’ (there is MPLS label on the third stage) and the LSP ID: 4141 thereof is the ID showing the OAM (for example, “14”) to determine whether the packet is the OAM packet and the TC: 4142 of the OAM identification MPLS label 414-3 of the packet is ‘0’ (S304). As a result of the determination, when it is determined that the packet is the OAM packet and the TC: 4142 thereof is ‘0’, the OAM payload is analyzed (S305) to determine the type of the OAM packet (S306). As a result of the determination, when it is determined that the packet is the loopback request OAM packet, the packet is transferred to the loopback processing section 109 (S307), thereby ending the process (S310). In this manner, the input header processing section can detect that the packet is the loopback request packet that should be looped back on the Ingress side of the device. When it is determined that the packet is the loopback response packet in S306 above, the packet is an abnormal packet. Therefore, the packet is discarded (S308), thereby ending the process (S310). When it is determined that the packet is other OAM packet in S306 above, the other OAM packet termination process is executed (S309), thereby ending the process (S310).

When it is determined that the packet is not the OAM packet or TC: 4142 of the OAM identification label 414-3 is not ‘0’ in S304 above, the packet is transferred as it is to the switch section, thereby ending the process (S310).

Figure 16:
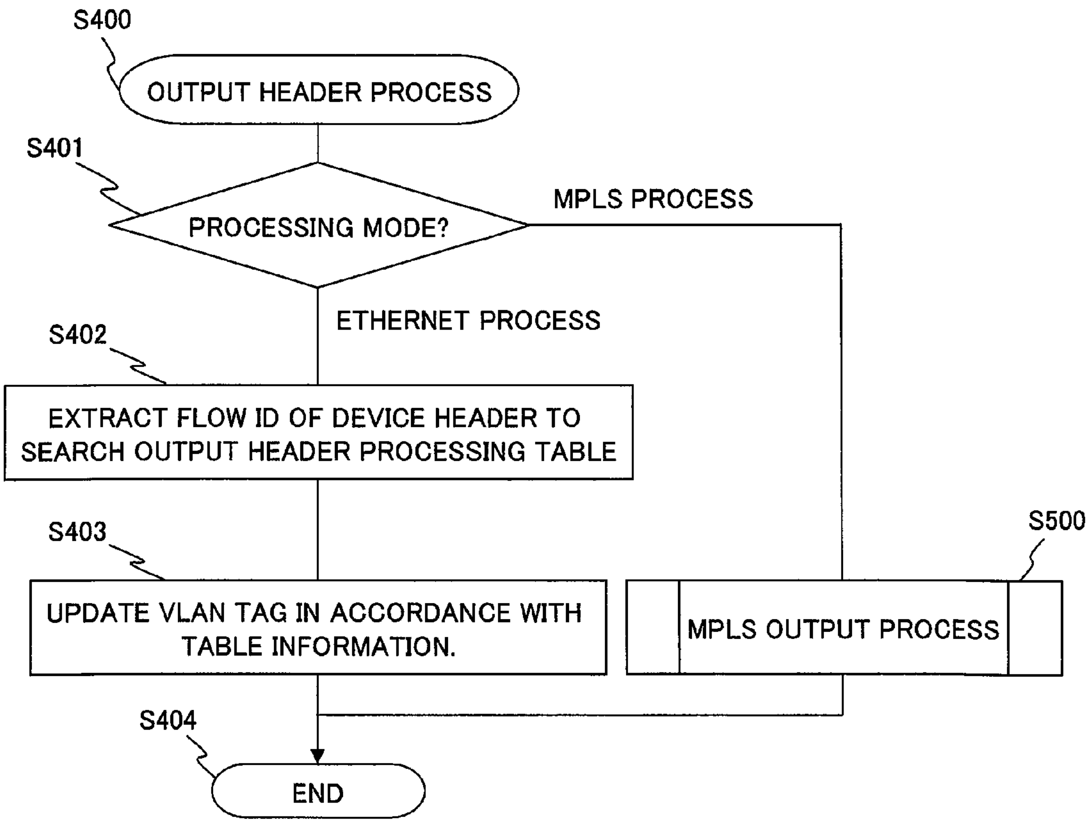
FIG. 16 is a flowchart of the output header process S400 executed by the output header processing section 106 in FIG. 6.

FIG. 16 shows a flowchart of the output header process S400 executed by the output header processing section 106.

The output header processing section 106 determines the processing mode set to the setting register 111 (S401), and when the Ethernet process is set, it extracts the flow ID: 451 of the device header 45 and searches the output header processing table 24 by using the extracted flow ID: 451 (S402). Then, it executes the process of the VLAN tag 403 in accordance with the acquired search result (S403), thereby ending the process (S404).

On the other hand, when the MPLS process is set to the setting register in S401 above, the MPLS process S500 is executed, thereby ending the process (S404).

Figure 17:
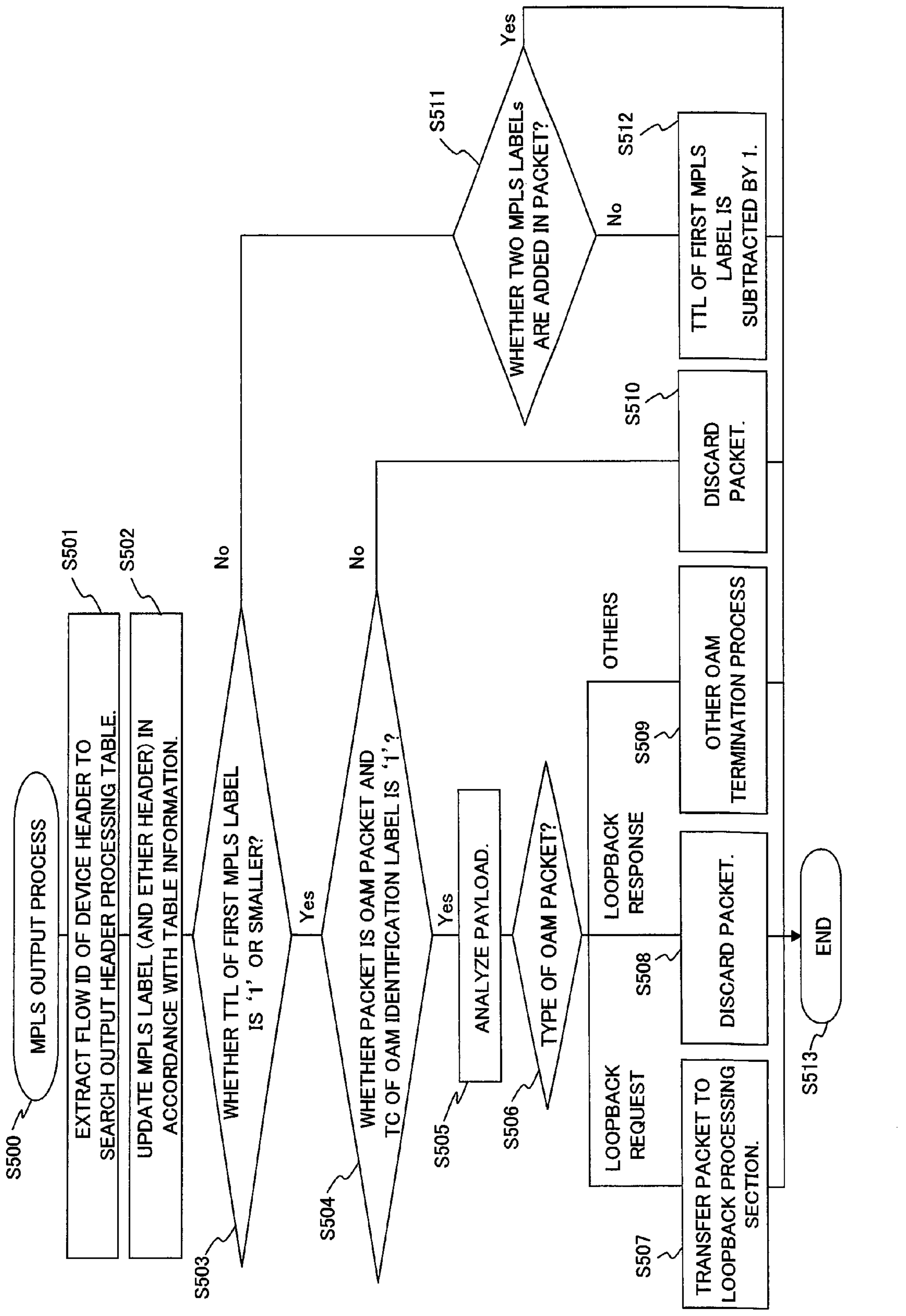
FIG. 17 is a flowchart of the MPLS output process S500 executed by the output header processing section 106 in FIG. 6.

In the MPLS output process S500 shown in FIG. 17, the flow ID: 451 of the device header 45 is extracted to search the output header processing table 24 (S501). The MPLS label 414 (and Ether header) is updated in accordance with the table information acquired as a result of the search (S502). Then, it is determined whether TTL: 4144 of the transfer MPLS label

414-1 is '1' or smaller (S503), and when it is larger than '1', it is determined whether the MPLS label process executed in S502 above is the two-MPLS-label addition including the Ether header (S511). When the MPLS label process is not the two-MPLS-label addition, the TTL: 4144 of the transfer MPLS label 414-1 is subtracted by '1' (S512), thereby ending the process (S513). On the other hand, when it is determined that the MPLS label process is the two-MPLS-label addition in S511 above, since the packet is the packet which has been subjected to the MPLS encapsulation in this device, it is transferred as it is, thereby ending the process (S513).

On the other hand, when TTL: 4144 of the transfer MPLS label 414-1 is '1' or smaller in S503 above, it is checked whether the S bit of the user identification MPLS label 414-2 is '0' (there is MPLS label on the third stage) and the LSP ID: 4141 thereof is the ID showing the OAM (for example, "14") to determine whether the packet is the OAM packet and the TC: 4142 of the OAM identification MPLS label 414-3 of the packet is '1' (S504). As a result of the determination, when it is determined that the packet is the OAM packet and the TC: 4142 thereof is '1', the OAM payload is analyzed (S505) to determine the type of the OAM packet (S506). As a result of the determination, when it is determined that the packet is the loopback request OAM packet, the packet is transferred to the loopback processing section 109 (S507), thereby ending the process (S513). In this manner, the output header processing section can detect that the packet is the loopback request packet that should be looped back on the Egress side of the device. When it is determined that the packet is the loopback response packet in S506 above, the packet is discarded (S508), thereby ending the process (S513). When it is determined that the packet is other OAM packet in S506 above, the other OAM packet termination process is executed (S509), thereby ending the process (S513).

When it is determined that the packet is not the OAM packet or the TC: 4142 of the OAM identification MPLS label 414-3 is not '1' in S504 above, the packet is discarded (S510), thereby ending the process (S513).

Figure 18:
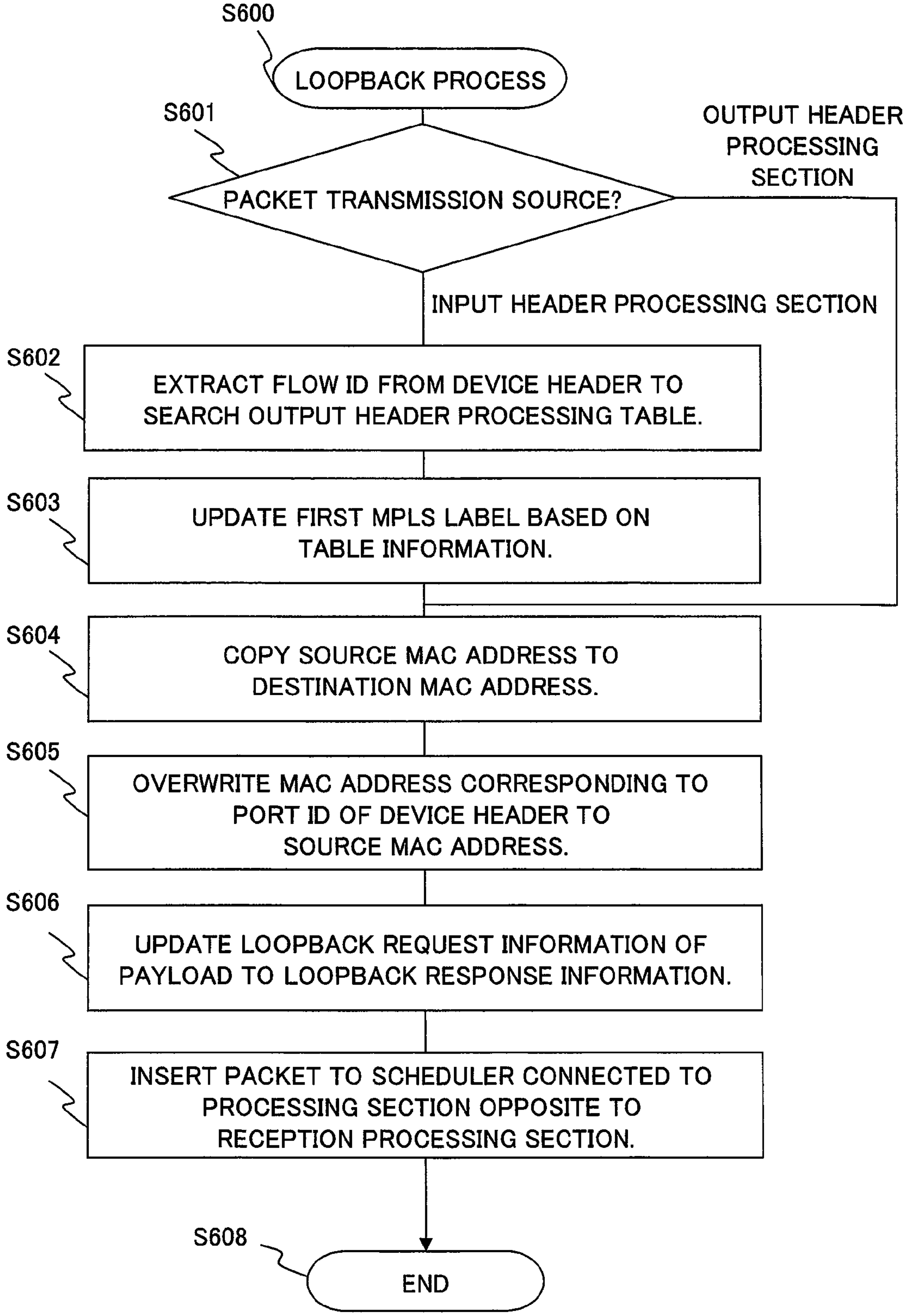
FIG. 18 is a flowchart of the loopback process S600 executed by the loopback processing section 109 in FIG. 6.

FIG. 18 shows a flowchart of the loopback process S600 executed by the loopback processing section 109.

When the loopback processing section 109 receives the loopback request OAM packet 42 that should be looped back, it determines the transmission source (S601), and when it is determined that the transmission source is the input header processing section 103, it extracts the flow ID: 451 from the device header 45 to search the output header processing table 24 (S602). The MPLS label 414 (and Ether header) is updated in accordance with the table information acquired as a result of the search (S603). Then, the source MAC address 412 is copied to the destination MAC address 411 (S604), and the MAC address corresponding to the port ID: 452 stored in the device header 45 is acquired from the setting register 111 and overwritten to the source MAC address 412 (S605). Then, the loopback request information of the payload section 424 is updated to the loopback response information (S606), and the packet is inserted to the scheduler connected to the processing section opposite to the processing section from which the packet has been received (when the packet is received from the input header processing section 103, the output header processing section 106, and when the packet is received from the output header processing section 106, the input header processing section 103) (S607), thereby ending the process (S608).

On the other hand, when it is determined that the transmission source of the loopback request OAM packet 42 is the output header processing section 106 in S601 above, the process of S604 and subsequent processes are carried out, thereby ending the process (S608).

Second Embodiment

Figure 19:
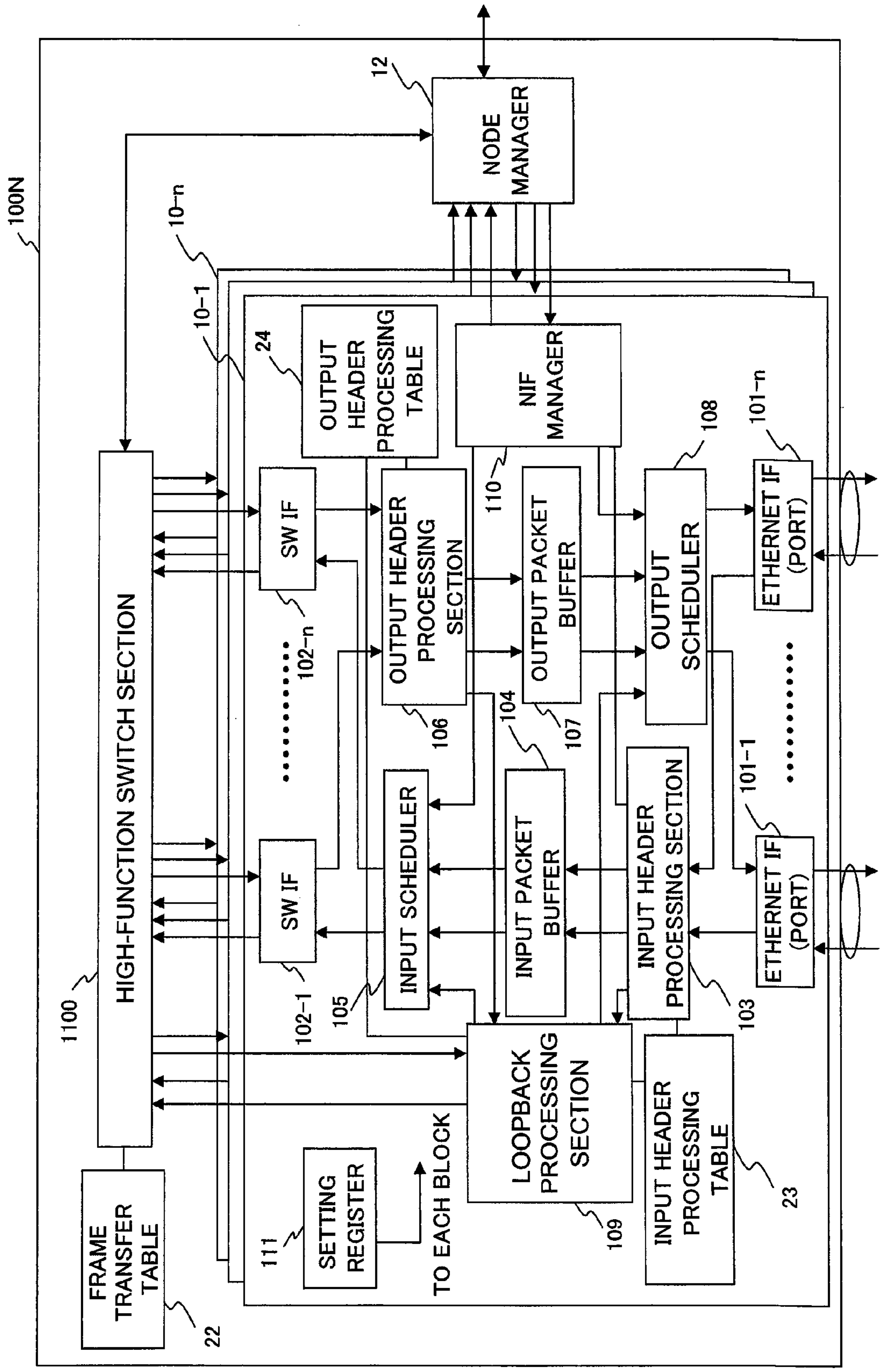
FIG. 19 is a block diagram showing the configuration of a communication device of another communication system to which the present invention is applied.

FIG. 19 shows a block configuration of another communication device 100N of the present invention.

In the communication device 100N, unlike the communication device 10N of the first embodiment, the switch section is replaced by a high-function switch section 1100. The configuration of each block other than that is the same as that of the communication device 10N. The high-function switch section 1100 has a feature of recognizing the first transfer MPLS label 414-1 and executing the subtracting process of the TTL 4144 thereof unlike the switch section 11 of the communication device 10N. For example, in the case of the device vendor which buys a general-purpose product for a switch chip and develops only the NIF: 10-*n*, the configuration of this embodiment may be employed.

Figure 20:
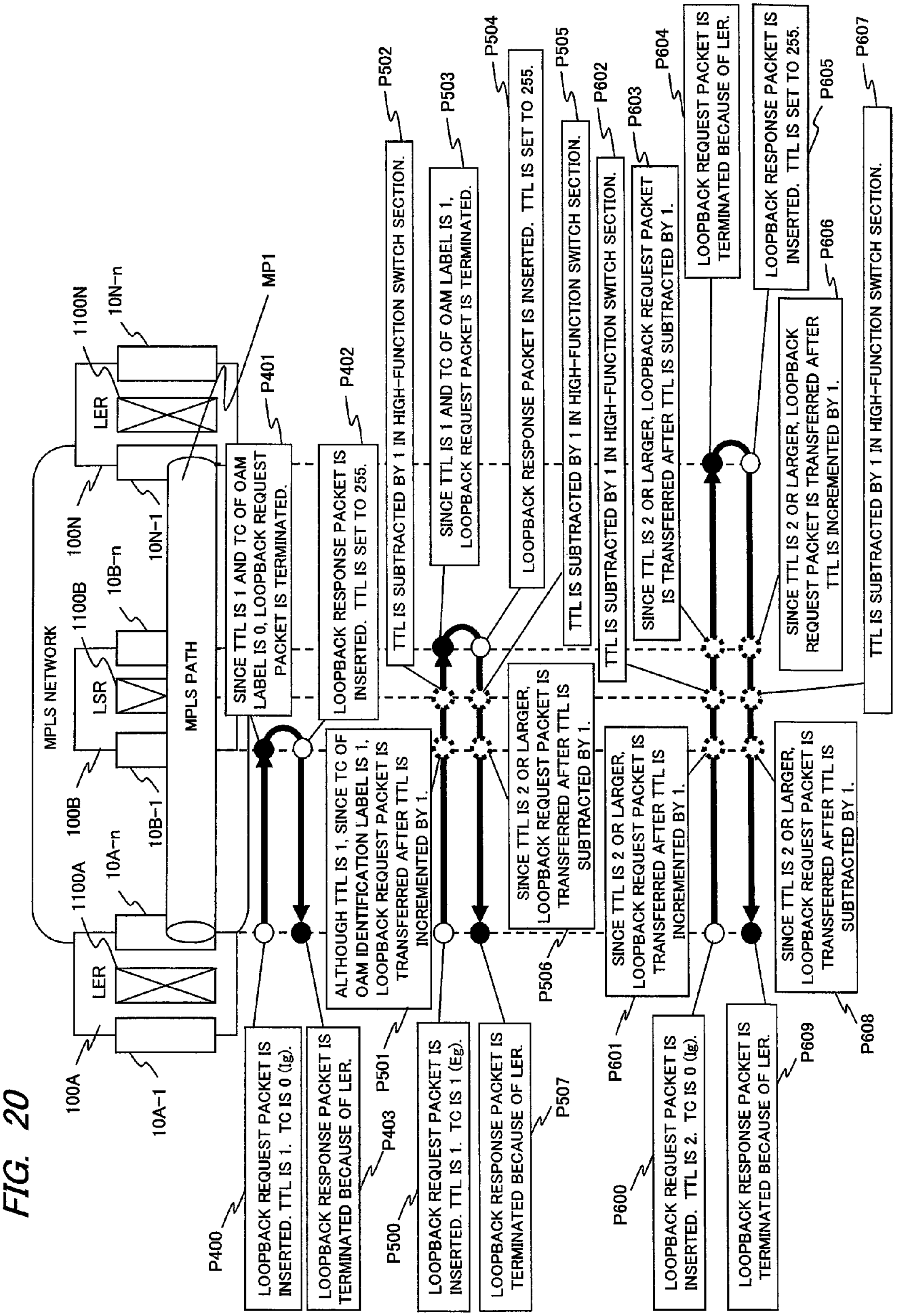
FIG. 20 is a diagram showing an example of a loopback test in another communication system to which the present invention is applied.

FIG. 20 shows an example of the loopback test using the OAM packet in another communication system of the present invention.

FIG. 20 shows a sequence of carrying out a loopback test by designating a loopback point of a loopback request OAM packet in a MPLS network MW1 from the communication device 100A in order to check the connectivity of a MPLS path MP1.

Firstly, the process flow in the case where an Ingress side of the NIF: 10B-1 of the communication device 100B which is one hop from the communication device 100A is taken as a loopback point will be described.

First, the communication device 100A carries out the process similar to P100 above to insert the loopback OAM packet 42 (P400).

When the loopback request OAM packet 42 reaches the Ingress side of the NIF: 10B-1 of the communication device 100B, the process similar to P101 above is carried out, and the packet is terminated (P401).

Subsequently, the process similar to P102 above is carried out to transmit the packet as the loopback response OAM packet 42 from the NIF: 10B-1 to the communication device 100A (P402).

Then, when the communication device 100A receives the loopback response OAM packet 42, it carries out the process similar to P103 above, and the packet is terminated (P403). In this manner, the loopback test on the Ingress side of the NIF: 10B-1 of the communication device 100B serving as LSR is completed.

Secondly, the process flow in the case where an Egress side of the NIF: 10B-n of the communication device 100B which is one hop from the communication device 100A is taken as a loopback point will be described.

First, the communication device 100A carries out the process similar to P200 above to insert the loopback OAM packet 42 (P500).

When the loopback request OAM packet 42 reaches the Ingress side of the NIF: 10B-1 of the communication device 100B, the analysis of the transfer MPLS label 414-1 is first carried out. Since TTL: 4144 is '1', it is determined that discard or loopback process is necessary in the device itself, and the analysis of the OAM identification MPLS label 414-3 is carried out. Since TC: 4142 is '1', the Ingress side loopback is not executed, and the loopback request OAM packet is transferred. However, '1' is added to TTL: 4144 of the transfer MPLS label 414-1 in expectation of the subtraction of the TTL: 4144 in the high-function switch section 1100 (P501). By this means, even when the subtraction of TTL is carried out in the high-function switch section, the discard of the loopback request OAM packet can be prevented.

When this loopback request OAM packet 42 reaches the high-function switch section 1100, the TTL: 4144 of the transfer MPLS label 414-1 of the loopback request OAM packet 42 is subtracted by '1', and then the packet is transferred (P502).

When the loopback request OAM packet 42 reaches the Egress side of the NIF: 10B-2 of the communication device 100B, the process similar to P202 above is carried out, and the packet is terminated (P503).

Subsequently, the insertion process of the loopback response OAM packet 42 similar to P102 is carried out (P504).

Then, when the loopback response OAM packet 42 reaches the high-function switch section 1100, the process similar to P502 above is carried out, and then the packet is transferred (P505).

Subsequently, when the loopback response OAM packet 42 reaches the Egress side of the NIF: 10B-1, the process similar to P204 above is carried out, and then the packet is transferred (P506).

Then, the communication device 100A carries out the reception process of the loopback response OAM packet 42 similar to P103 (P507). In this manner, the loopback test on the Egress side of the NIF: 10B-2 of the communication device 100B serving as LSR is completed.

Finally, the process flow in the case where an Ingress side of NIF: 10N-1 of the communication device 100N which is two hops from the communication device 100A is taken as a loopback point will be described.

First, the communication device 100A carries out the process similar to P300 above to insert the loopback OAM packet 42 (P600).

When the loopback request OAM packet 42 reaches the Ingress side of the NIF: 10B-1 of the communication device 100B, the analysis of the transfer MPLS label 414-1 is carried out. Since TTL: 4144 is "2" or larger, the loopback request OAM packet is transferred. However, '1' is added to TTL: 4144 of the transfer MPLS label 414-1 in expectation of the subtraction of the TTL: 4144 in the high-function switch section 1100 (P601).

When this loopback request OAM packet 42 reaches the high-function switch section 1100, the process similar to P502 above is carried out, and then the packet is transferred (P602).

When this loopback request OAM packet 42 reaches the Egress side of the NIF: 10B-n of the communication device 100B, the process similar to P204 above is carried out, and then the packet is transmitted (P603).

When the transmitted loopback request OAM packet 42 reaches the Ingress side of the NIF: 10N-1 of the communication device 100N, the process similar to P303 above is carried out, and the packet is terminated (P604).

Subsequently, the insertion process of the loopback response OAM packet 42 similar to P102 is carried out (P605).

When this loopback response OAM packet 42 reaches the Ingress side of the NIF: 10B-n of the communication device 100B, the process similar to P601 above is carried out, and then the packet is transmitted (P606).

Then, when this loopback response OAM packet 42 reaches the high-function switch section 1100, the process similar to P502 above is carried out, and then the packet is transferred (P607).

Subsequently, when the loopback response OAM packet 42 reaches the Egress side of the NIF: 10B-1 of the communication device 100B, the process similar to P204 above is carried out, and then the packet is transmitted (P608).

Then, the communication device 100A carries out the reception process of the loopback response OAM packet 42 similar to P103 above (P609). In this manner, the loopback test on the Ingress side of the NIF: 10N-1 of the communication device 100N serving as LER is completed.

As described above, it is possible to realize the loopback test of the communication device by designating the Ingress side and the Egress side of the communication device even when the high-function switch section is used, in other words, even when the TTL of the transfer label is subtracted by "1" in the switch section.

Figure 21:
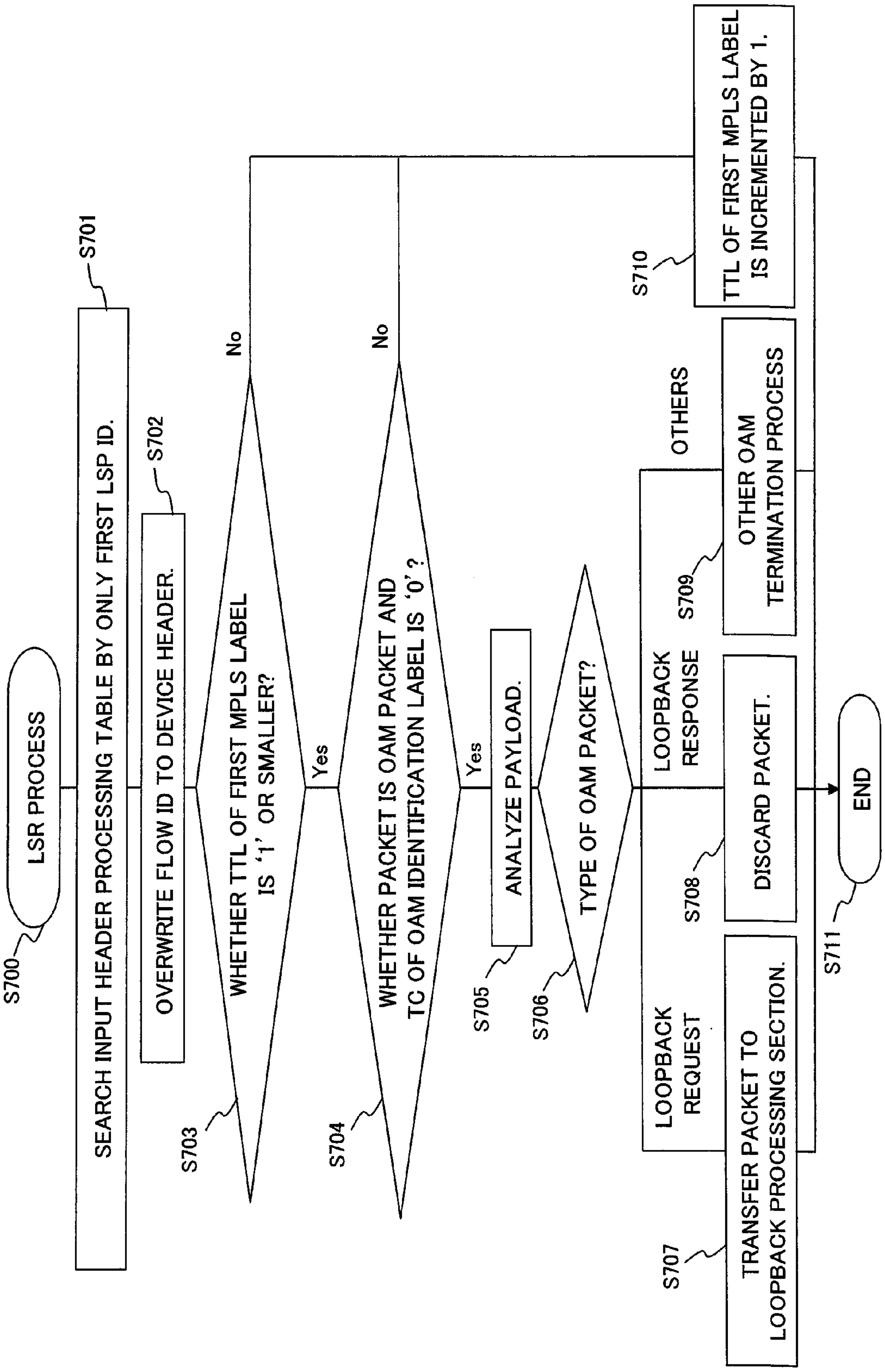
FIG. 21 is a flowchart of the LSR process S700 executed by the input header processing section 103 in FIG. 19.

FIG. 21 shows a flowchart of the LSR process S700 executed by the input header processing section 103 of this embodiment. The input header process S100 other than the LSR process S700 is the same as that of the first embodiment. Also, the processes other than that are the same as those of the first embodiment.

The input header processing unit 103 searches the input header processing table 23 by using only the LSP ID: 4141 of the first transfer MPLS label 414-1 in the LSR process S700 (S701). As a result, the flow ID: 234 is acquired, and it is overwritten to the device header 45 (S702). Then, it is determined whether the TTL: 4144 of the transfer MPLS label 414-1 is '1' or smaller (S703), and when it is larger than '1', the TTL: 4144 of the first transfer MPLS label 414-1 is incremented by '1', thereby ending the process (S711). On the other hand, when TTL: 4144 of the transfer MPLS label 414-1 is '1' or smaller in S703, it is checked whether the S bit of the user identification MPLS label 414-2 is '0' (there is MPLS label on the third stage) and the LSP ID: 4141 thereof is the ID showing the OAM (for example, "14") to determine whether the packet is the OAM packet and the TC: 4142 of the OAM identification MPLS label 414-3 of the packet is '0' (S704). As a result of the determination, when it is determined that the packet is the OAM packet and the TC: 4142 thereof is '0', the OAM payload is analyzed (S705) to determine the type of the OAM packet (S706). As a result of the determination, when it is determined that the packet is the loopback request OAM packet, the packet is transferred to the loopback processing section 109 (S707), thereby ending the process (S711). When it is determined that the packet is the loopback response packet in S706 above, the packet is discarded (S708), thereby ending the process (S711). When it is determined that the packet is other OAM packet in S706 above, the other OAM packet termination process is executed (S709), thereby ending the process (S711).

When it is determined that the packet is not the OAM packet or TC: 4142 of the OAM identification MPLS label 414-3 is not '0' in S704 above, the TTL: 4144 of the first transfer MPLS label 414-1 is incremented by '1' (S710), thereby ending the process (S711).

Third Embodiment

Figure 22:
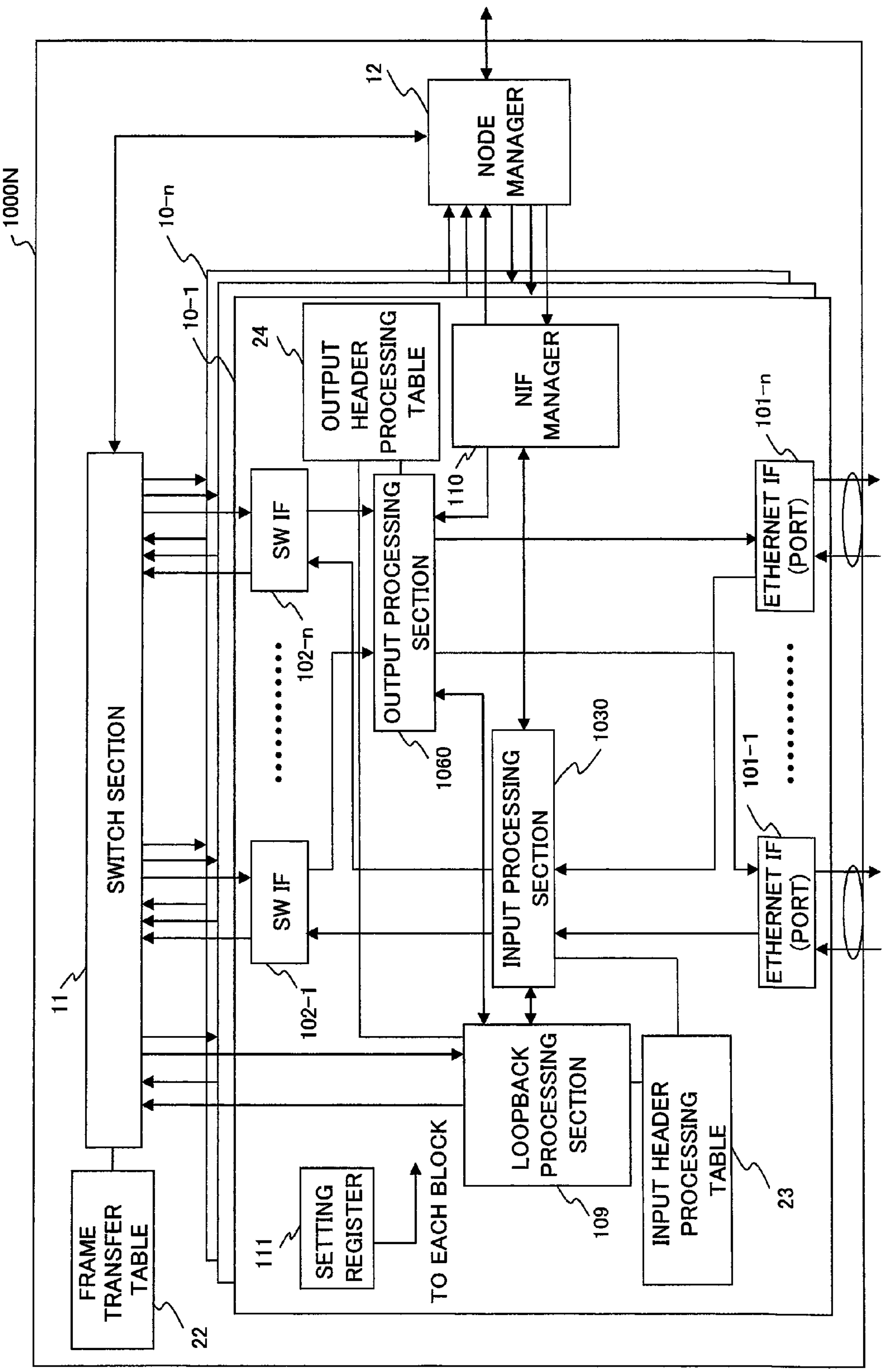
FIG. 22 is a block diagram showing the configuration of a communication device of another communication system to which the present invention is applied.

FIG. 22 shows a block configuration of another communication device 1000N of the present invention.

In the configuration of the communication device 1000N, unlike the communication device 10N of the first embodiment, the input header processing section 103, the input packet buffer 104, and the input scheduler 105 are replaced by an input processing section 1030, and the output header processing section 106, the output packet buffer 107, and the output scheduler 108 are replaced by an output processing section 1060. The configuration of each block other than those is the same as that of the communication device 10N.

Figure 23:
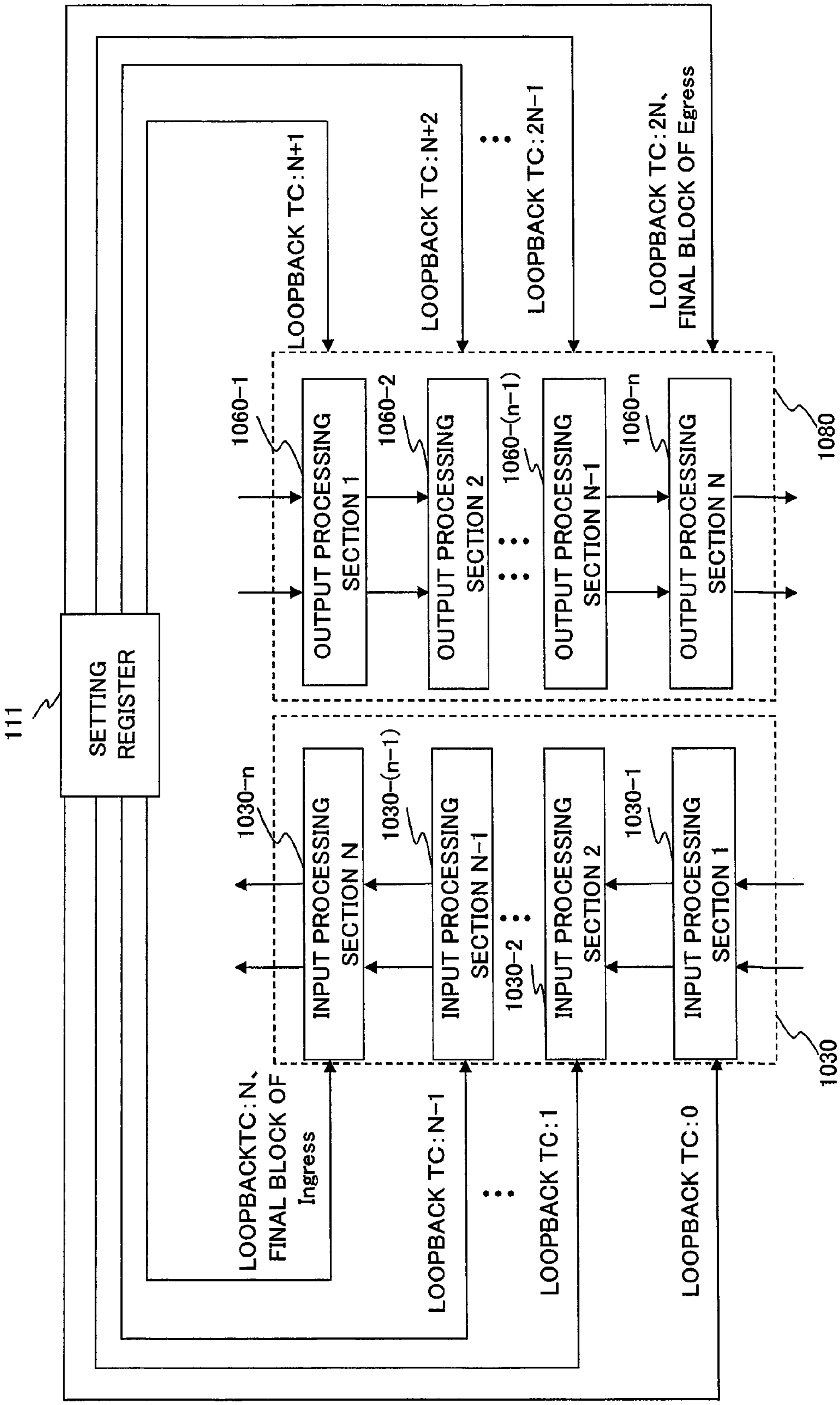
FIG. 23 is a block diagram showing the configuration of the input processing section 1030 and the output processing section 1060 in FIG. 22.

The input processing section 1030 and the output processing section 1060 have the multi-stage configuration of a plurality of processing sections as shown in FIG. 23, the input processing section 1030 is made up of N input processing sections 1030-1 to 1030-N, and the output processing section 1060 is made up of N output processing sections 1060-1 to 1060-N. Each of the input sections 1030-1 to 1030-N is made up of three blocks equivalent to the input header processing section 103, the input packet buffer 104, and the input scheduler 105 of the communication device 10N. Furthermore, each of the output processing sections 1060-1 to 1060-N is similarly made up of three blocks equivalent to the output header processing section 106, the output packet buffer 105, and the output scheduler 106 of the communication device 10N.

Also, in each of the input processing sections 1030-1 to 1030-N and the output processing sections 1060-1 to 1060-N, the TC which should be looped back at the block is set from the setting register 111 as a loopback TC. N pieces of the loopback TCs are provided on the input (Ingress) side, and M pieces of the loopback TCs are provided on the output (Egress) side. Since TC: 4142 is configured of 3 bits, the value up to "8" can be set as N×2. By the setting as described above, a plurality of loopback points can be designated by using a plurality of the values of the TC: 4142 in the case where the input processing section 1030 and the output processing section 1060 have the multi-stage configuration as shown in FIG. 23.

Further, to each of the input processing sections 1030-1 to 1030-N and the output processing sections 1060-1 to 1060-N, whether it is the final block of the Ingress or the Egress is simultaneously set from the setting register 111. By this means, the subtraction and increment process of the TTL: 4144 can be carried out in only the final block, and the excessive subtraction and increment of the TTL: 4144 can be prevented in the process even when a plurality of blocks are passed through.

Each of the input processing sections 1030-1 to 1030-N executes the process similar to the input header processing section 103, the input packet buffer 104, and the input scheduler 105 of the communication device 10N, but the LER process S200 and the LSR process S300 of the input header process S100 are changed to the LER process S800 and the LSR process S900, respectively.

The process other than that described above is the same as that of the first embodiment.

Furthermore, each of the output processing sections 1060-1 to 1060-N executes the process similar to the output header processing section 106, the output packet buffer 107, and the output scheduler 108 of the communication device 10N, but the MPLS output process S500 of the output header process S400 is changed to the MPLS output process S1000.

Furthermore, though not shown, in the process of S607 to insert the loopback response packet in the loopback process S600 executed by the loopback processing section 109 of the communication device 10N, the loopback processing section 109 of this embodiment inserts the packet to the scheduler connected to the processing section opposite to the processing section that has received the packet (when the packet is received from the input processing section 1030-X, to the output processing section 1060-X, and when the packet is received from the output processing section 1060-X, to the input processing section 1030-X).

Figure 24:
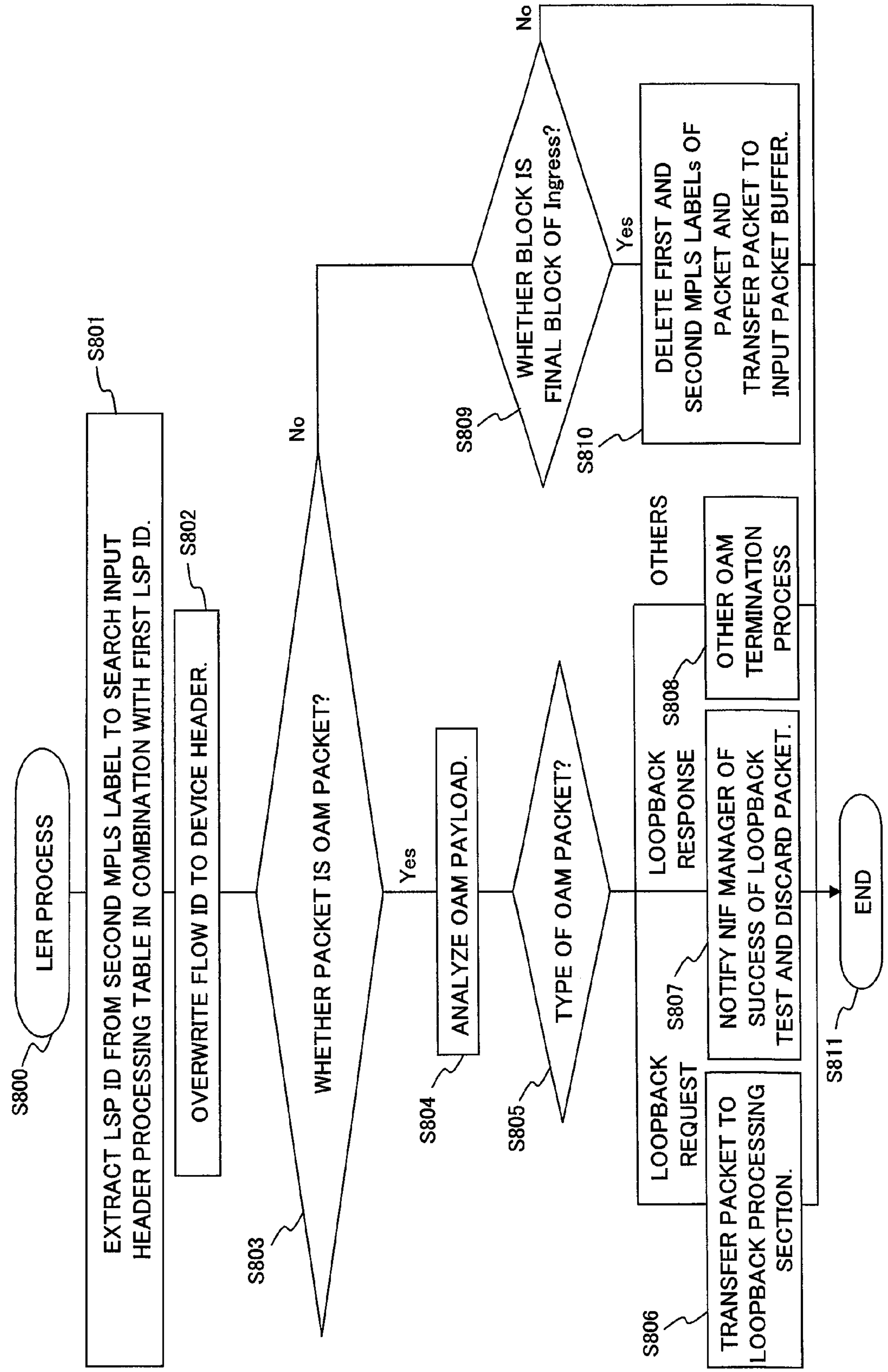
FIG. 24 is a flowchart of the LER process S800 executed by the input processing sections 1030-1 to 1030-N in FIG. 22.

FIG. 24 shows the LER process of the input processing section. In the LER process S800, the input processing section 1030 extracts the LSP ID: 4141 from the second user identification MPLS label 414-2 and searches the input header processing table 23 in combination with the LSP ID: 4141 of the first transfer MPLS label 414-1 (S801). As a result, the flow ID: 234 is acquired and it is overwritten to the device header 45 (S802). Then, it checks whether the S bit of the user identification MPLS label 414-2 is '0' (there is MPLS label on the third stage) and the LSP ID: 4141 thereof is the ID showing the OAM (for example, "14") to determine whether the packet is an OAM packet or not (S803). As a result of this determination, when it is determined that the packet is an OAM packet, the OAM payload is analyzed (S804) to determine the type of the OAM packet (S805). As a result of this determination, when it is determined that the packet is a loopback request OAM packet, the packet is transferred to the loopback processing section 109 (S806), thereby ending the process (S811). When it is determined that the packet is a loopback response packet in S805 above, the success of the loopback test is notified to the NIF manager 110, and the packet is discarded (S807), thereby ending the process (S811). When it is determined that the packet is other packet in S805 above, the other OAM packet termination process is executed (S808), thereby ending the process (S811).

When it is determined that the packet is not an OAM packet in S803 above, it is checked whether the block is set as the final block of the Ingress in the setting register 111 (S809). When it is the final block, the transfer MPLS label 414-1 and the user identification MPLS label 414-2 of the packet are deleted and the packet is transferred to the subsequent block (input packet buffer of the input processing sections 1030-1 to 1030-N) (S810), thereby ending the process (S811). On the other hand, when it is determined that the block is not the final block of the Ingress in S809 above, the packet is transferred as it is, thereby ending the process (S811).

Figure 25:
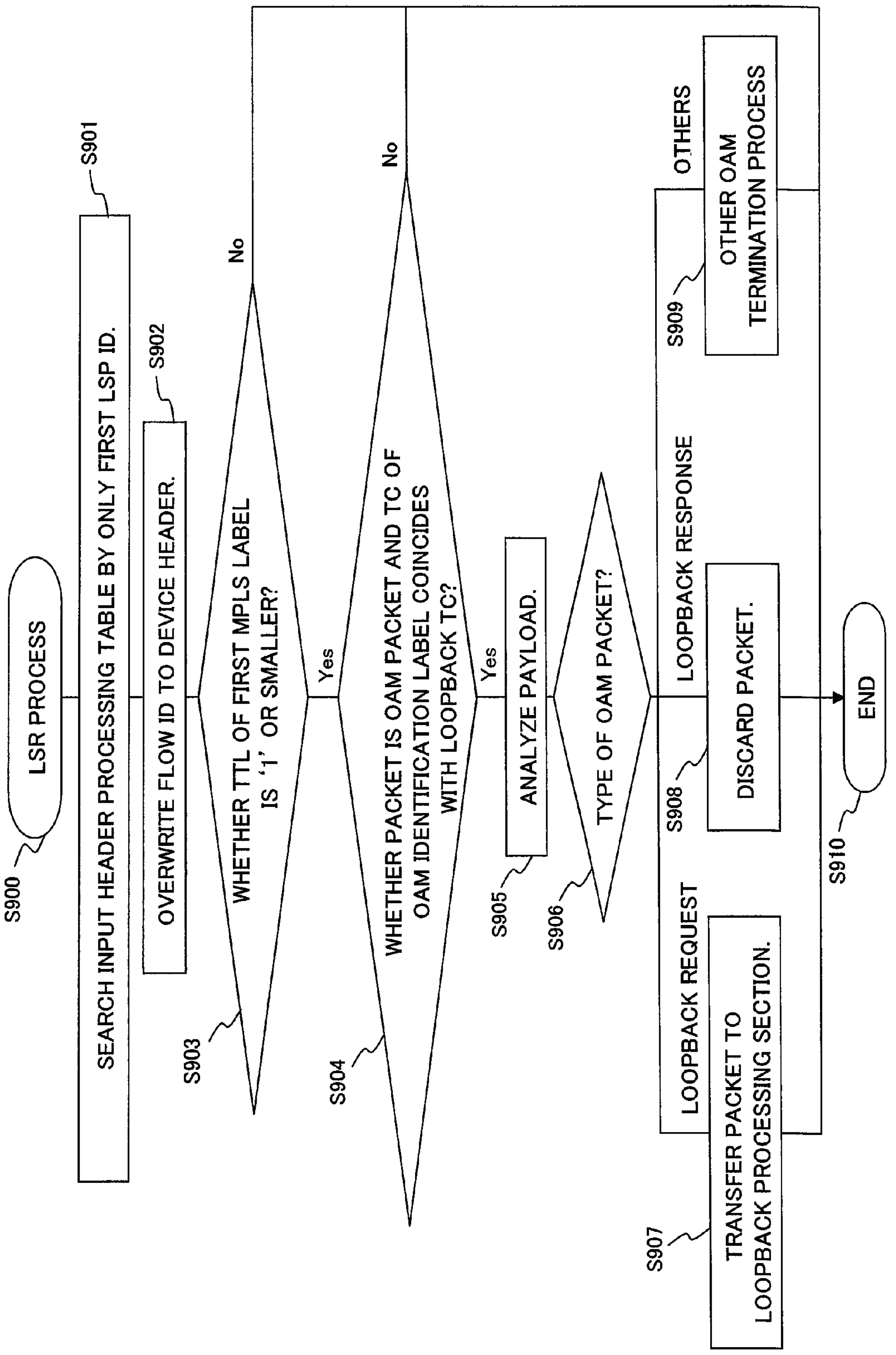
FIG. 25 is a flowchart of the LSR process S900 executed by the input processing sections 1030-1 to 1030-N in FIG. 22.

FIG. 25 shows the LSR process of the input processing section. In the LSR process S900, the input header processing table 23 is searched by using only the LSP ID: 4141 of the first transfer MPLS label 414-1 (S901). As a result, the flow ID: 234 is acquired, and it is overwritten to the device header 45 (S902). Then, it is determined whether the TTL: 4144 of the transfer MPLS label 414-1 is '1' or smaller (S903), and when it is larger than '1', the process is ended as it is (S910). On the other hand, when TTL: 4144 of the transfer MPLS label 414-1 is '1' or smaller in S903, it is checked whether the S bit of the user identification MPLS label 414-2 is '0' (there is MPLS label on the third stage) and the LSP ID: 4141 thereof is the ID showing the OAM (for example, "14") to determine whether the packet is the OAM packet and the TC: 4142 of the OAM identification MPLS label 414-3 of the packet coincides with the loopback TC set to the setting register 111 (S904). As a result of the determination, when it is determined that the packet is the OAM packet and the TC: 4142 thereof coincides with the loopback TC, the OAM payload is analyzed (S905) to determine the type of the OAM packet (S906). As a result of the determination, when it is determined that the packet is the loopback request OAM packet, the packet is transferred to the loopback processing section 109 (S907), thereby ending the process (S910). When it is determined that the packet is the loopback response packet in S906 above, the packet is an abnormal packet. Therefore, the packet is discarded (S908), thereby ending the process (S910). When it is determined that the packet is other OAM packet in S906 above, the other OAM packet termination process is executed (S909), thereby ending the process (S910).

When it is determined that the packet is not the OAM packet or the TC: 4142 of the OAM identification MPLS label 414-3 does not coincide with the loopback TC in S904 above, the packet is transferred as it is, thereby ending the process (S910). In this manner, a plurality of loopback points can be designated on the Ingress side of the communication device by using a plurality of the values to a specific field of the header information other than the transfer TTL in the case of the multi-stage configuration like the input processing section 1030.

Figure 26:
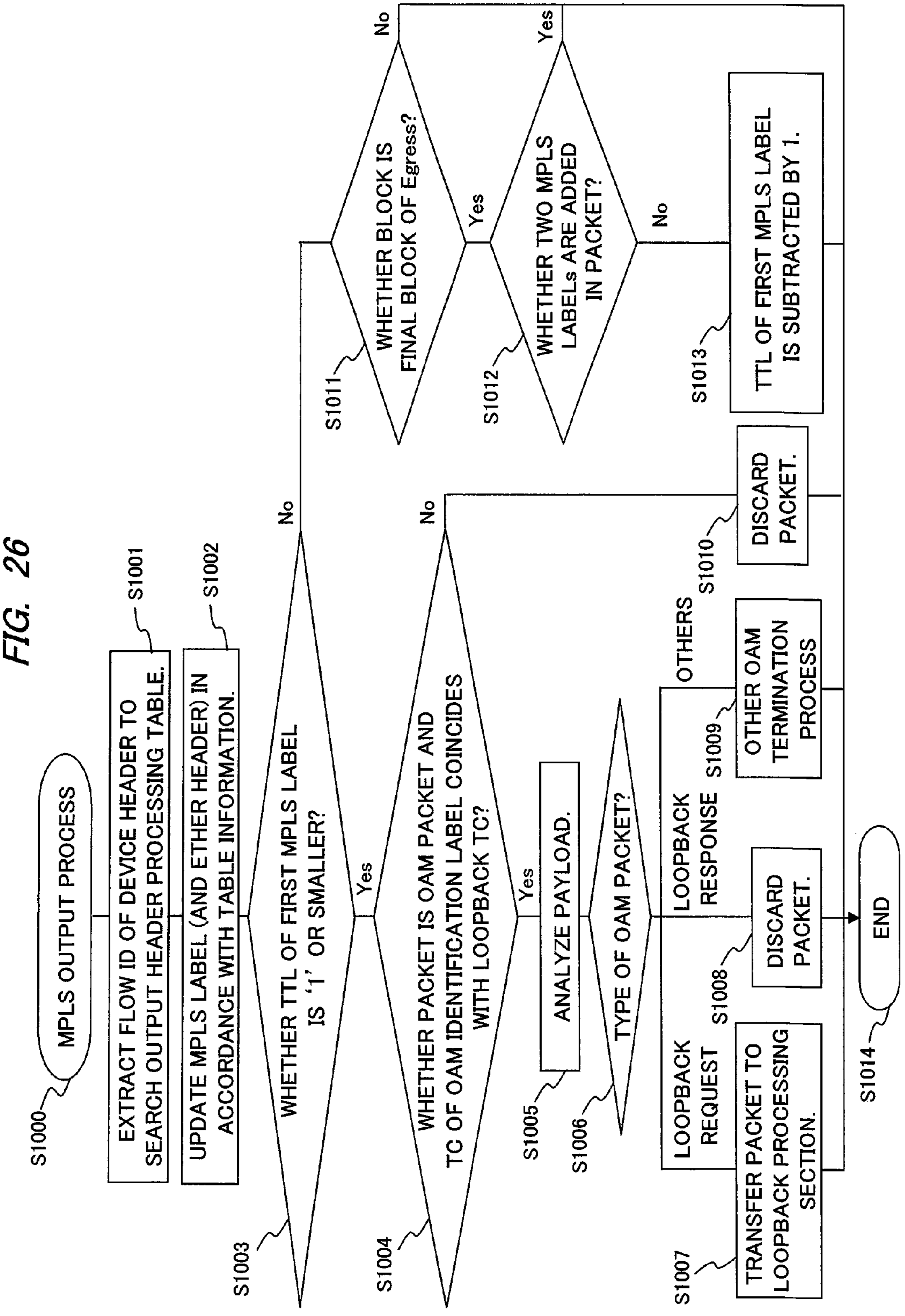
FIG. 26 is a flowchart of the MPLS output process S1000 executed by the output processing sections 1060-1 to 1060-N in FIG. 22.

FIG. 26 shows the MPLS output process of the output processing section. In the MPLS output process S1000, the flow ID: 451 of the device header 45 is extracted to search the output header processing table 24 (S1001). The MPLS label 414 (and Ether header) is updated in accordance with the table information acquired as a result of the search (S1002). Then, it is determined whether the TTL: 4144 of the transfer MPLS label 414-1 is '1' or smaller (S1003), and when it is larger than '1', it is checked whether the block is set as the final block of the Egress in the setting register 111 (S1011). When it is the final block, it is determined whether the MPLS label process executed in S1002 above is the two-MPLS-label addition including the Ether header (S1012). When the MPLS label process is not the two-MPLS-label addition, the TTL: 4144 of the transfer MPLS label 414-1 is subtracted by '1' (S1013), thereby ending the process (S1014). On the other hand, when it is determined that the block is not the final block of the Egress in S1011 above, the packet is transferred as it is, thereby ending the process (S1014).

On the other hand, when it is determined that the MPLS label process is the two-MPLS-label addition in S1012 above, since the packet is the packet which has been subjected to the MPLS encapsulation in this device, it is transferred as it is, thereby ending the process (S1014).

On the other hand, when TTL: 4144 of the transfer MPLS label 414-1 is '1' or smaller in S1003 above, it is checked whether the S bit of the user identification MPLS label 414-2 is '0' (there is MPLS label on the third stage) and the LSP ID: 4141 thereof is the ID showing the OAM (for example, "14") to determine whether the packet is the OAM packet and the TC: 4142 of the OAM identification MPLS label 414-3 of the packet coincides with the loopback TC set to the setting register 111 (S1004). As a result of the determination, when it is determined that the packet is the OAM packet and the TC: 4142 thereof coincides with the loopback TC, the OAM payload is analyzed (S1005) to determine the type of the OAM packet (S1006). As a result of the determination, when it is determined that the packet is the loopback request OAM packet, the packet is transferred to the loopback processing section 109 (S1007), thereby ending the process (S1014). When it is determined that the packet is the loopback response packet in S1006 above, the packet is discarded (S1008), thereby ending the process (S1014). When it is determined that the packet is other OAM packet in S1006 above, the other OAM packet termination process is executed (S1009), thereby ending the process (S1014).

When it is determined that the packet is not the OAM packet or the TC: 4142 of the OAM identification MPLS label 414-3 does not coincide with the loopback TC in S1004 above, the packet is discarded (S1010), thereby ending the process (S1014).

In this manner, a plurality of loopback points can be designated on the Ingress side of the communication device by using a plurality of the values to a specific field of the header information other than the transfer TTL in the case of the multi-stage configuration like the output processing section 1060.

Fourth Embodiment

Figure 27:
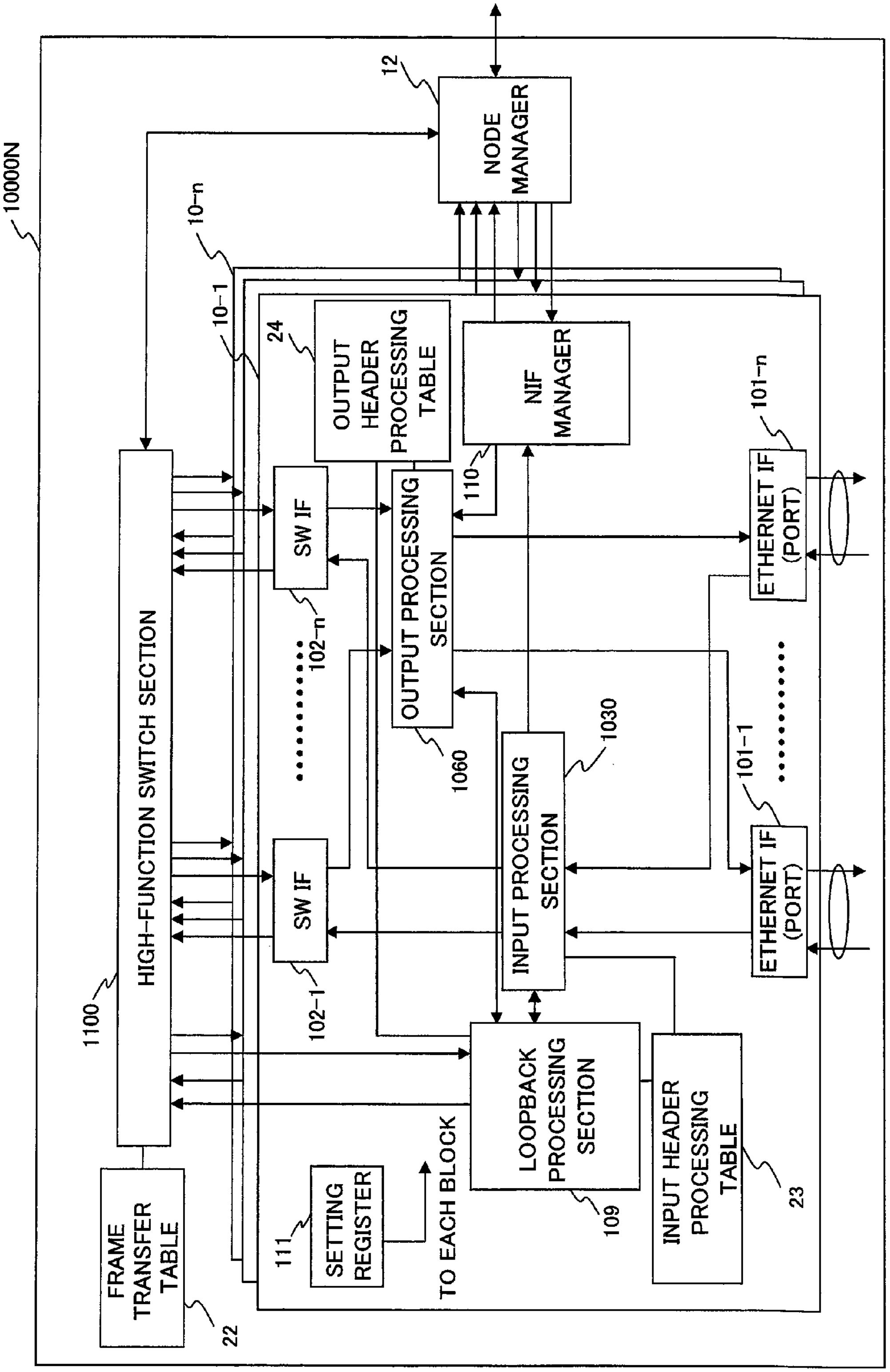
FIG. 27 is a block diagram showing the configuration of a communication device of another communication system to which the present invention is applied.

FIG. 27 shows a block configuration of another communication device 10000N of the present invention.

In the communication device 10000N, unlike the communication device 1000N of the third embodiment, the switch section is replaced by a high-function switch section 1100. The configuration of each block other than that is the same as that of the communication device 1000N. The high-function switch section 1100 has a feature of recognizing the first transfer MPLS label 414 and executing the subtracting process of the TTL 4144 thereof unlike the switch section 11 of the communication device 1000N. For example, in the case of the device vendor which buys a general-purpose product for a switch chip and develops only the NIF: 10-*n*, the configuration of this embodiment may be employed.

Figure 28:
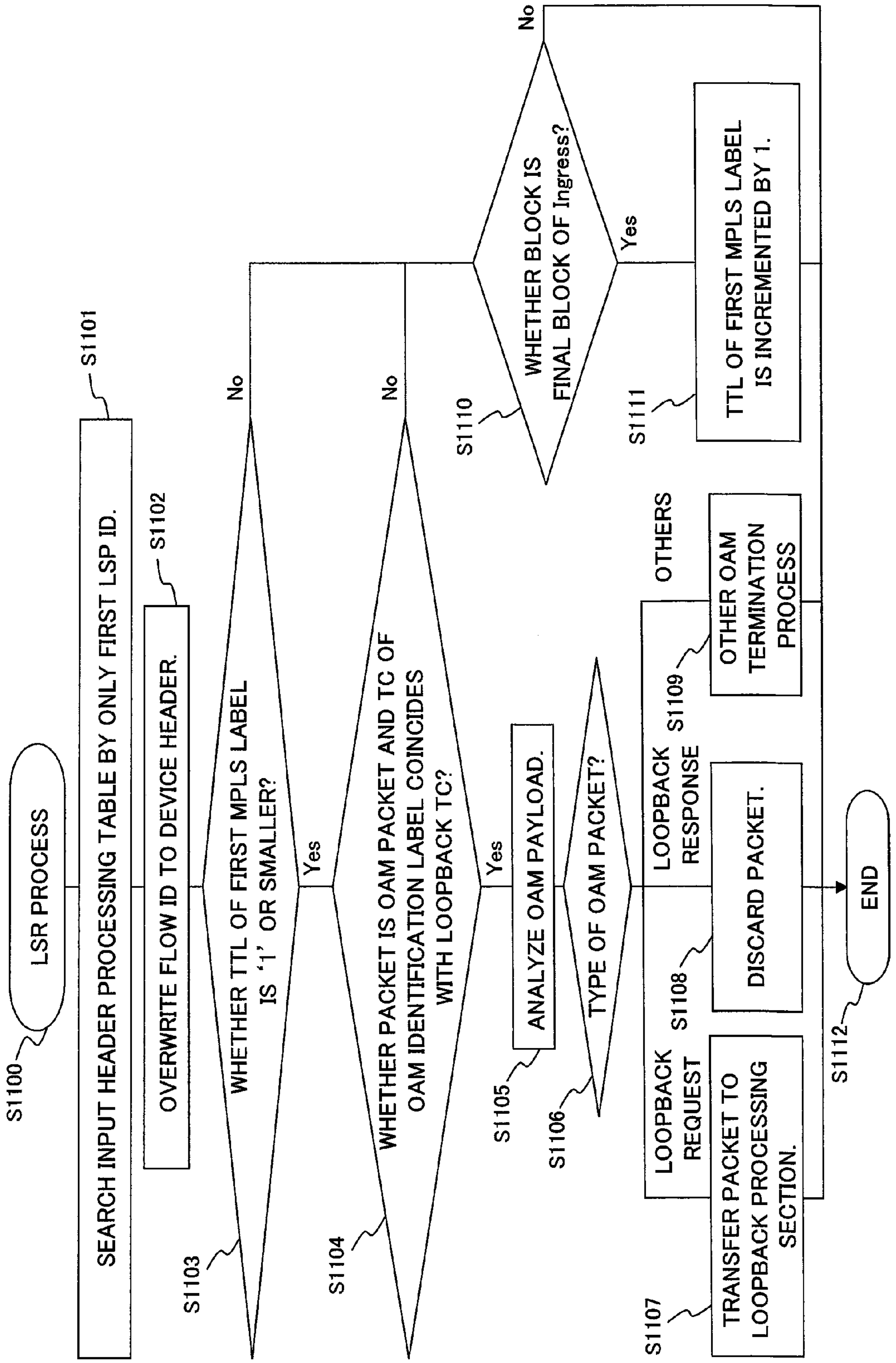
FIG. 28 is a flowchart of the LSR process S1100 executed by the input processing sections 1030-1 to 1030-N in FIG. 27.

FIG. 28 shows a flowchart of the LSR process S1100 executed by the input header processing section 1030 of this embodiment. The input header process S100 other than the LSR process S1100 is the same as that of the third embodiment. Furthermore, the processes other than that are the same as those of the third embodiment.

In the LSR process S1100 shown in FIG. 28, the input header processing table 23 is searched by using only the LSP ID: 4141 of the first transfer MPLS label 414-1 (S1101). As a result, the flow ID: 234 is acquired, and it is overwritten to the device header 45 (S1102). Then, it is determined whether the TTL: 4144 of the transfer MPLS label 414-1 is '1' or smaller (S1103), and when it is larger than '1', it is determined whether this block is the final block of the Ingress from the setting register 111 (S1110). When it is the final block, the TTL: 4144 of the first transfer MPLS label 414-1 is subtracted by '1', thereby ending the process (S1112). On the other hand, when it is determined that the block is not the final block in S1110 above, the packet is transferred as it is, thereby ending the process (S1112).

On the other hand, when TTL: 4144 of the transfer MPLS label 414-1 is '1' or smaller in S1103 above, it is checked whether the S bit of the user identification MPLS label 414-2 is '0' (there is MPLS label on the third stage) and the LSP ID: 4141 thereof is the ID showing the OAM (for example, "14") to determine whether the packet is the OAM packet and the TC: 4142 of the OAM identification MPLS label 414-3 of the packet coincides with the loopback TC set to the setting register 111 (S1104). As a result of the determination, when it is determined that the packet is the OAM packet and the TC: 4142 thereof coincides with the loopback TC, the OAM payload is analyzed (S1105) to determine the type of the OAM packet (S1106). As a result of the determination, when it is determined that the packet is the loopback request OAM packet, the packet is transferred to the loopback processing section 109 (S1107), thereby ending the process (S1112). When it is determined that the packet is the loopback response packet in S1106 above, the packet is an abnormal packet. Therefore, the packet is discarded (S1108), thereby ending the process (S1112). When it is determined that the packet is other OAM packet in S1106 above, the other OAM packet termination process is executed (S1109), thereby ending the process (S1112).

When it is determined that the packet is not the OAM packet or the TC: 4142 of the OAM identification MPLS label 414-3 does not coincide with the loopback TC in S1104 above, the process of S1110 and subsequent processes are carried out, thereby ending the process (S1112).

EXPLANATION OF REFERENCE NUMERALS

10A, 10B, 10N: communication device

10A-1, 10A-n, 10B-1, 10B-n, 10N-1, 10N-n: interface (NIF) of communication device 10

100N: communication device

1000N: communication device
10000N: communication device

The invention claimed is:

1. A communication system comprising;

a plurality of communication devices transferring a packet between the plurality of communication devices through a communication path, wherein the plurality of communication devices includes a first communication device and a second communication device, wherein in order to verify connectivity of the communication path, between the first communication device and the second communication device:

the first communication device stores, in a first region of header information of the packet, first information for designating the second communication device at which the packet should be looped back, the first communication device further stores, in a second region of the header information of the packet, second information on a loopback point of the second communication device, the first communication device sends the packet, to which the first information and the second information have been added, and the second communication device receives the packet to which the first information and the second information have been added and determines whether the packet should be looped back at the second communication device itself by referring to the first information of the packet, and upon determining that the packet should be looped back at the second communication device itself, the second communication device determines the loopback point of the second communication device by referring to the second information, and then transmits a response packet to the first communication device, wherein the first region is a portion showing a packet Time To Live of a transfer label, and the second region is a portion of a label showing failure-related information.

2. The communication system according to claim 1, wherein the loopback point is at an input side or an output side of the second communication device.

3. The communication system according to claim 2, wherein the second communication device which receives the packet to which the first information and the second information have been added is provided with an input header processing section, an output header processing section, and a loopback processing section, the header processing section determines whether the packet should be looped back at the second communication device itself by referring to the first information of the packet, when it is determined that the packet should be looped back by the second communication device itself, further determines whether the packet should be looped back at the input header processing section by referring to the second information, upon determining that the packet should be looped back at the input header processing section, transfers the packet to the loopback processing section, and when it is determined that the packet should not looped back at the second communication device itself or the input header processing section, transfers the packet to an output side, and when the loopback processing section receives the packet from the input header processing section, it generates a response packet with respect to the packet and transmits it to the first communication device.

4. The communication system according to claim 3, wherein, when the output header processing section receives the packet via the input header processing section, the output header processing section determines whether the packet should be looped back at the second communication device itself by referring to the first information, when it is determined that the packet should be looped back, further determines whether the packet should be looped back at the output header processing section by referring to the second information, when it is determined that the packet should be looped back at the output header processing section, transfers the packet to the loopback processing section, and when it is determined that the packet should not be looped at the second communication device itself or the output header processing section, transfers the packet to a communication device of a next destination, and when the loopback processing section receives the packet from the output header processing section, it generates a response packet with respect to the packet and transmits it to the first communication device.

5. The communication system according claim 2, wherein the first communication device is provided with a network interface manager which adds the transfer label and the label showing failure-related information, the second communication device which receives the packet to which the first information and the second information have been added is provided with an input header processing section and an output header processing section which transfer the packet to a destination communication device on the communication path by referring to the transfer label, and a loopback processing section which generates a response packet with respect to the packet, the input header processing section or the output header processing section of the second communication device determines whether the packet should be looped back at the second communication device itself by referring to the first information stored in the portion showing the packet time to live of the transfer label of the packet, when it is determined that the packet should be looped back, further determines whether the packet should be looped back at the input header processing section or the output header processing section by referring to the second information stored in the part of the label showing the failure-related information, and when it is determined that the packet should be looped back at the input header processing section or the output header processing section, transfers the packet to the loopback processing section, and when the loopback processing section of the second communication device receives the packet from the input header processing section or the output header processing section, it generates a response packet with respect to the packet and transmits it to the first communication device.

6. The communication system according to claim 1, wherein a third communication device on the communication path which receives the packet, to which the first information and the second information have been added, determines whether the packet should be looped back at the third communication device itself by referring to the first information of the packet, and when a determination is made that the packet should not to be looped back at the third communication device, the third communication device transmits the packet to another one of the communication devices which is a next destination on the communication path without referring to the second information.

7. The communication system according to claim 1, wherein the second communication device is provided with one or more network interfaces and a switch section connected to the network interfaces, the one or more network interfaces are each provided with an input header processing section and an output header processing section, and when the packet is received at one of the network interfaces, the input header processing section increments a value of a frame time to live in the first region if it is determined that the packet is not a packet to be looped back at the second communication device itself by referring to the first region and it is determined that the packet is not a packet to be looped back on an input side by referring to the second region.

8. The communication system according to claim 1, wherein the second communication device is provided with one or more network interfaces and a switch section connected to the network interfaces, the one or more network interfaces are provided with one or more input processing sections and one or more output processing sections, and the input processing section determines whether the packet should be looped back at the second communication device itself by referring to the first region and determines whether the packet should be looped back at the input processing section by referring to the second region.

9. A first communication device located at a start point of a communication path in a communication system which transfers a packet via a plurality of communication devices by using the communication path, the first communication device comprising:

a plurality of network interface boards, each including a plurality of input/output line interfaces serving as communication ports;

a switch section connected to each of the plurality of network interface boards; and a node manager managing the first communication device, wherein in order to verify connectivity of the communication path between the first communication device and a second communication device:

the node manager stores, in a first region of header information of the packet, first information for designating the second communication device at which the packet should be looped back, the node manager further stores, in a second region of the header information of the packet, second information on a loopback point of the second communication device, and the node manager sends the packet, to which the first information and the second information have been added, and the node manager receives a response packet from the second communication device when the packet is determined to be looped back at the second communication device based on the first information of the packet and when the loopback point is determined in the second communication device based on the second information, wherein the first region is a portion showing a packet time to live of a transfer label, and the second region is a portion of a label showing failure-related information.

10. The communication device according to claim 9, wherein the first communication device is provided with a network interface manager which generates the packet to which the first information and the second information have been added and an interface which sends the packet.

11. The communication device according to claim 10, wherein, when the response packet with respect to the packet to which the first information and the second information have been added is received from the second communication device on the communication path, the first communication device notifies the network interface manager of the reception of the response packet.

12. A second communication device located at a point other than a start point of a communication path in a communication system which transfers a packet via a plurality of communication devices by using the communication path, the communication device comprising:

a plurality of network interface boards, each including a plurality of input/output line interfaces serving as communication ports;

a switch section connected to each of the plurality of network interface boards; and a node manager managing the second communication device, wherein when connectivity of the communication path is to be verified, a network interface board of the plurality of network interface boards determines whether the packet should be looped back at the second communication device itself by referring to a first region of the packet sent from a first communication device located at the start point of the communication path, when it is determined that the packet should be looped back at the second communication device itself, the network interface board determines a loopback point of the communication device itself by referring to a second region of the packet sent from the first communication device and transmits a response packet with respect to the packet to the first communication device, wherein first information for designating the second communication device is stored in the first region, second information on a loopback point of the second communication device is stored in the second region, and the first region is a portion showing a packet Time to Live of a transfer label, and the second region is a portion of a label showing failure-related information.

13. The second communication device according to claim 12, wherein the loopback point is at an input side or an output side of the communication device.

14. The second communication device according to claim 12, wherein each of the network interface boards is provided with an input header processing section and an output header processing section, and when the packet is received at the network interface, the input header processing section increments a value of a frame time to live in the first region upon determining that the packet is not a packet to be looped back at the second communication device itself by referring to the first region and upon determining that the packet is not a packet to be looped back on an input side by referring to the second region.

15. The communication device according to claim 14, further comprising a loopback processing section, wherein, upon determining in the input processing section or the output processing section that the packet is a packet which is to be looped back at the input processing section or the output processing section, the loopback processing section discards the packet, generates a response packet, and transmits the response packet to the first communication device located at the start point of the communication path.

16. The second communication device according to claim 12, wherein each of the network interface boards is provided with one or more input processing sections and one or more output processing sections, and the input processing section determines whether the packet should be looped back at the second communication device itself by referring to the first region, and further determines whether the packet should be looped back at the input processing section by referring to the second region.

17. The communication device according to claim 16, further comprising a loopback processing section, wherein, upon determining in the input processing section or the output processing section that the packet is a packet which is looped back at the input processing section or the output processing section, the loopback processing section discards the packet, generates a response packet, and transmits the response packet to the first communication device located at the start point of the communication path.

* * * * *